(12) United States Patent
Fox

(10) Patent No.: US 12,488,635 B1
(45) Date of Patent: Dec. 2, 2025

(54) DEVICES AND METHODS OF DATA SIMPLIFICATION FOR NEAR REAL-TIME TELEMATICS DATA

(71) Applicant: Geotab Inc., Oakville (CA)

(72) Inventor: Stephen Michael Fox, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/078,836

(22) Filed: Mar. 13, 2025

Related U.S. Application Data

(60) Provisional application No. 63/751,513, filed on Jan. 30, 2025.

(51) Int. Cl.
G07C 5/00 (2006.01)
G07C 5/08 (2006.01)

(52) U.S. Cl.
CPC ............. G07C 5/008 (2013.01); G07C 5/085 (2013.01)

(58) Field of Classification Search
CPC ................................ G07C 5/008; G07C 5/085
See application file for complete search history.

(56) References Cited

U.S. PATENT DOCUMENTS

| | | |
|---|---|---|
| 6,522,267 B2 | 2/2003 | Flick |
| 6,647,270 B1 | 11/2003 | Himmelstein |
| 6,765,499 B2 | 7/2004 | Flick |
| 7,058,040 B2 | 6/2006 | Schmidt |
| 7,188,026 B2 | 3/2007 | Tzamaloukas |
| 7,260,153 B2 | 8/2007 | Nissani et al. |
| 7,450,955 B2 | 11/2008 | Himmelstein |
| 7,522,594 B2 | 4/2009 | Piche et al. |
| 7,551,677 B2 | 6/2009 | Crawford |
| 7,602,784 B2 | 10/2009 | Piche et al. |
| 7,684,807 B2 | 3/2010 | Schmidt |
| 7,742,388 B2 | 6/2010 | Shearer et al. |
| 7,747,291 B2 | 6/2010 | Himmelstein |
| 7,907,976 B2 | 3/2011 | Himmelstein |
| 8,032,276 B2 | 10/2011 | Cawse |
| 8,600,422 B2 | 12/2013 | Himmelstein |
| 8,670,928 B2 | 3/2014 | Cawse |

(Continued)

FOREIGN PATENT DOCUMENTS

| | | |
|---|---|---|
| CA | 2488030 | 8/2007 |
| WO | 2023240262 A1 | 12/2023 |

OTHER PUBLICATIONS

Moore, Andrew. Canadian Patent No. 2,299,582 for Automatic Mobile Object Locator Apparatus and Method issued Apr. 20, 2004.

Primary Examiner — Michael V Kerrigan
(74) Attorney, Agent, or Firm — Sherif A. Abdel-Kader

(57) ABSTRACT

Methods by a telematics device and a telematics device for simplifying captured telematics data and providing near real-time data points to a telematics server. Simplifying the data uses an algorithm that prioritizes primary data while providing timely secondary data under various conditions. In some implementations, a data simplification method is applied to partially filled data captured buffers containing secondary data. In some implementations, partially filled data capture buffers are processed if data points of that data type have not been selected for sending or if the data capture buffers are filled over a particular threshold. In some implementations, data points having an estimate error greater than an estimate error threshold are selected for sending to the telematics server.

20 Claims, 23 Drawing Sheets

(56) References Cited

U.S. PATENT DOCUMENTS

| | | |
|---|---|---|
| 8,706,348 B2 | 4/2014 | Beams et al. |
| 8,965,695 B2 | 2/2015 | Tzamaloukas |
| 9,208,129 B2 * | 12/2015 | Plante ............... G07C 5/0866 |
| 9,445,270 B1 | 9/2016 | Bicket et al. |
| 10,057,777 B2 | 8/2018 | Li et al. |
| 10,085,149 B2 | 9/2018 | Bicket et al. |
| 10,206,107 B2 | 2/2019 | Bicket et al. |
| 10,390,227 B2 | 8/2019 | Bicket et al. |
| 10,484,848 B2 | 11/2019 | Cavalcanti et al. |
| 10,587,366 B2 | 3/2020 | Chervyakov et al. |
| 10,756,869 B2 | 8/2020 | Khoryaev et al. |
| 10,827,324 B1 | 11/2020 | Hajimiri et al. |
| 10,999,269 B2 | 5/2021 | Bicket et al. |
| 11,019,553 B1 | 5/2021 | Bhambhani et al. |
| 11,122,488 B1 | 9/2021 | Lloyd et al. |
| 11,190,373 B1 | 11/2021 | Stevenson et al. |
| 11,356,909 B1 | 6/2022 | Lloyd |
| 11,431,537 B2 | 8/2022 | Khoryaev et al. |
| 11,432,135 B2 | 8/2022 | Shan |
| 11,432,220 B2 | 8/2022 | Xu et al. |
| 11,452,115 B2 | 9/2022 | Khoryaev et al. |
| 11,516,749 B2 | 11/2022 | Scholand et al. |
| 11,546,395 B2 | 1/2023 | Sukhov et al. |
| 11,553,503 B2 | 1/2023 | Parron et al. |
| 11,556,509 B1 | 1/2023 | Sukhov et al. |
| 11,593,329 B2 | 2/2023 | Sukhov et al. |
| 11,595,995 B2 | 2/2023 | Khoryaev et al. |
| 11,601,919 B2 | 3/2023 | Ye et al. |
| 11,606,736 B1 | 3/2023 | Lloyd et al. |
| 11,609,888 B2 | 3/2023 | Sukhov et al. |
| 11,646,822 B2 | 5/2023 | Zhang et al. |
| 11,659,060 B2 | 5/2023 | Davis et al. |
| 11,670,116 B2 | 6/2023 | Davidson |
| 11,671,907 B2 | 6/2023 | Kedalagudde et al. |
| 11,688,211 B1 | 6/2023 | Calmer et al. |
| 11,710,355 B1 | 7/2023 | Wenneman et al. |
| 11,711,176 B2 | 7/2023 | Khoryaev et al. |
| 11,736,312 B1 | 8/2023 | Xiao et al. |
| 11,838,364 B2 | 12/2023 | Sukhov et al. |
| 11,855,801 B1 | 12/2023 | Stevenson et al. |
| 11,910,263 B2 | 2/2024 | Xu et al. |
| 11,917,040 B1 | 2/2024 | Mendez Rodriguez et al. |
| 11,930,082 B1 | 3/2024 | Singh et al. |
| 11,950,182 B2 | 4/2024 | Stojanovski et al. |
| 11,956,782 B2 | 4/2024 | Shilov et al. |
| 11,997,181 B1 | 5/2024 | Davis et al. |
| 11,997,530 B2 | 5/2024 | Ali et al. |
| 11,997,741 B1 | 5/2024 | Francis et al. |
| 12,004,111 B2 | 6/2024 | Shan |
| 12,028,289 B2 | 7/2024 | Ye et al. |
| 12,028,884 B2 | 7/2024 | Panteleev et al. |
| 12,041,583 B2 | 7/2024 | Ye et al. |
| 12,041,600 B2 | 7/2024 | Mueck et al. |
| 12,052,602 B2 | 7/2024 | Ali et al. |
| 12,052,743 B2 | 7/2024 | Panteleev et al. |
| 12,058,562 B2 | 8/2024 | Khoryaev et al. |
| 12,063,505 B2 | 8/2024 | Guo et al. |
| 12,063,657 B2 | 8/2024 | Panteleev et al. |
| 12,089,278 B2 | 9/2024 | Wu et al. |
| 12,113,746 B2 | 10/2024 | Panteleev et al. |
| 12,120,581 B1 | 10/2024 | Gal et al. |
| 12,229,092 B2 | 2/2025 | Sukhov et al. |
| 2006/0276199 A1 | 12/2006 | Flick |
| 2019/0206150 A1 | 7/2019 | Zucconelli et al. |
| 2021/0120595 A1 | 4/2021 | Singh et al. |
| 2021/0136699 A1 | 5/2021 | Scholand et al. |
| 2021/0195386 A1 | 6/2021 | Hajimiri et al. |
| 2022/0159628 A1 | 5/2022 | Bangolae et al. |
| 2022/0311582 A1 | 9/2022 | Ye et al. |
| 2022/0417820 A1 | 12/2022 | Xu et al. |
| 2023/0125160 A1 | 4/2023 | Sirotkin et al. |
| 2023/0144397 A1 | 5/2023 | Ye et al. |
| 2023/0156792 A1 | 5/2023 | Yao et al. |
| 2023/0171314 A1 | 6/2023 | Onti Srinivasan et al. |
| 2023/0209553 A1 | 6/2023 | Ye et al. |
| 2024/0003749 A1 | 1/2024 | Lin et al. |
| 2024/0096139 A1 | 3/2024 | Mesde et al. |
| 2024/0098746 A1 | 3/2024 | Ye et al. |
| 2024/0146629 A1 | 5/2024 | Lloyd |
| 2024/0217555 A1 | 7/2024 | Shin |
| 2024/0224235 A1 | 7/2024 | Miao |
| 2024/0333802 A1 | 10/2024 | Mesde et al. |

* cited by examiner

DEVICES AND METHODS OF DATA SIMPLIFICATION FOR NEAR REAL-TIME TELEMATICS DATA

RELATED APPLICATIONS

This application claims priority from U.S. provisional application 63/751,513 filed on 30 Jan. 2025, the contents of which are herein incorporated by reference in their entirety.

FIELD

The present disclosure generally relates to vehicle telematics, and more specifically to devices and methods of data simplification for near real-time telematics data.

BACKGROUND

A telematics system may gather asset data using a telematics device. The telematics device may be integrated into or located onboard the asset. The asset may be a vehicle ("vehicular asset") or some other stationary equipment. The telematics device may collect the asset data from the asset through a data connection with the asset. In the case of a vehicular asset, the telematics device may gather the asset data through an onboard diagnostic port (OBD). The gathered asset data may include engine revolutions-per-minute (RPM), battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, etc. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure there is provided a method in a telematics device coupled to an asset via an interface port thereof. The method comprises capturing a first plurality of data points of at least one primary data type from one of: a first electronic control unit of the asset, a first sensor of the telematics device, and a location module of the telematics device, into at least one primary data capture buffer; capturing at least one plurality of data points of at least one secondary data type from at least one of: a second electronic control unit of the asset, a second sensor of the telematics device, and the location module, into at least one secondary data capture buffer. When the at least one secondary data capture buffer is full, the method includes performing a data simplification method on the secondary data capture buffer, and storing any selected secondary data points selected by the data simplification method in a send buffer. When the at least one primary data capture buffer is full, the method includes performing the data simplification method on the at least one primary data capture buffer, and storing any selected primary data points selected by the data simplification method in the send buffer. In response to storing any selected primary data points in the send buffer, the method includes generating a send trigger causing the telematics device to transmit, using a network interface thereof, data points stored in the send buffer, to a telematics server over a network connecting the telematics device and the telematics server.

The method may further comprise in response to storing any selected primary data points in the send buffer: when there are no data points of the at least one secondary data type stored in the send buffer: performing the data simplification method on the at least one secondary data capture buffer even if the at least one secondary capture buffer is partially filled; and storing any selected secondary data points selected by the data simplification method in the send buffer.

The at least one secondary data capture buffer may comprise a plurality of secondary data capture buffers each storing captured data points of a secondary data type, and the method may further comprise: in response to storing any selected primary data points in the send buffer: for each current data capture buffer of the plurality of secondary data capture buffers: when there are no data points of the secondary data type corresponding to the current data capture buffer stored in the send buffer, performing the data simplification method on the current data capture buffer even if the current data capture buffer is partially filled; and storing any selected secondary data points selected by the data simplification method in the send buffer.

The method may further comprise in response to storing any selected primary data points in the send buffer: when a number of data points in the at least one secondary data capture buffer exceeds a particular threshold, performing the data simplification method on the at least one secondary data capture buffer even if the secondary capture buffer is partially filled; and storing any selected secondary data points selected by the data simplification method in the send buffer.

The at least one secondary data capture buffer may comprise a plurality of secondary data capture buffers each storing captured data points of a secondary data type, and the method may further comprise: in response to storing any selected primary data points in the send buffer: for each current data capture buffer of the plurality of secondary data capture buffers: when a number of data points in the current data capture buffer exceeds a particular threshold, performing the data simplification method on the current data capture buffer even if the current data capture buffer is partially filled; and storing any selected secondary data points selected by the data simplification method in the send buffer.

The method may further comprise: in response to storing any selected primary data points in the send buffer: performing the data simplification method on the at least one secondary data capture buffer even if the secondary capture buffer is partially filled; and storing any selected secondary data points selected by the data simplification method in the send buffer.

The at least one secondary data capture buffer may comprise a plurality of secondary data capture buffers each storing captured data points of a secondary data type, and the method may further comprise: in response to storing any selected primary data points in the send buffer: for each current data capture buffer of the plurality of secondary data capture buffers: performing the data simplification method on the current data capture buffer even if the current data capture buffer is partially filled; and storing any selected secondary data points selected by the data simplification method in the send buffer.

The method may further comprise transmitting data points stored in the send buffer in response to any one of: detecting a send timeout and detecting that the send buffer is almost full.

Performing the data simplification method on a data capture buffer may comprise: when there are any points of maximum error having an error distance greater than an acceptable error limit in the data capture buffer: selecting any points of maximum error having the error distance greater than the acceptable error limit; placing all selected points of maximum error in the send buffer; placing a last selected point of maximum error in a first location in the data capture buffer; placing a last data point in the data capture buffer as a third data point in the data capture; and placing a point of maximum error between the last selected point of maximum error and the last data point, in a second location of the data capture buffer.

The error distance may comprise a vertical distance between a data point in the data capture buffer and a line segment drawn between a first point in the data capture buffer and a last point in the data capture buffer.

The error distance may comprise a perpendicular distance between a data point in the data capture buffer and a line segment drawn between a first point in the data capture buffer and a last point in the data capture buffer.

The method may further comprise when there are no points of maximum error having an error distance greater than the acceptable error limit, keeping a first data point of the data capture buffer in the first location thereof.

The method may further comprise when the last data point has an estimate error greater than an estimate error threshold, placing the last data point in the send buffer.

In another aspect of the present disclosure, there is provided a telematics device, for connecting with an asset. The asset comprises a controller; an asset interface coupled to the controller, the asset interface for connecting the telematics device with an asset communications bus of the asset; a network interface coupled to the controller; and a memory coupled to the controller, the memory storing machine-executable programming instructions. The machine-executable programming instructions when executed by the controller configure the telematics device to: capture a first plurality of data points of a primary data type from one of: a first electronic control unit of the asset, a first sensor of the telematics device, and a location module of the telematics device, into a primary data capture buffer; capture at least one plurality of data points of at least one secondary data type from at least one electronic control module of the asset different from the first electronic control unit, or at least one sensor of the telematics device different from the first sensor, into at least one secondary data capture buffer; when the at least one secondary data capture buffer is full: perform a data simplification method on the secondary data capture buffer, and store any selected secondary data points selected by the data simplification method in a send buffer; when the primary data capture buffer is full: perform the data simplification method on the primary data capture buffer, and store any selected primary data points selected by the data simplification method in the send buffer; and in response to storing any selected primary data points in the send buffer: generate a send trigger causing the telematics device to transmit, using a network interface thereof, data points stored in the send buffer, to a telematics server over a network connecting the telematics device and the telematics server.

The machine-executable programming instructions may further configure the telematics device to in response to storing any selected primary data points in the send buffer: when there are no data points of the at least one secondary data type stored in the send buffer: perform the data simplification method on the at least one secondary data capture buffer even if the at least one secondary capture buffer is partially filled; and store any selected secondary data points selected by the data simplification method in the send buffer.

The at least one secondary data capture buffer may comprise a plurality of secondary data capture buffers each storing captured data points of a secondary data type, and the machine-executable programming instructions further configure the telematics device to: in response to storing any selected primary data points in the send buffer: for each current data capture buffer of the plurality of secondary data capture buffers: when there are no data points of the secondary data type corresponding to the current data capture buffer stored in the send buffer, perform the data simplification method on the current data capture buffer even if the current data capture buffer is partially filled; and store any selected secondary data points selected by the data simplification method in the send buffer.

The machine-executable programming instructions may further configure the telematics device to: in response to storing any selected primary data points in the send buffer: when a number of data points in the at least one secondary data capture buffer exceeds a particular threshold, perform the data simplification method on the at least one secondary data capture buffer even if the secondary capture buffer is partially filled; and store any selected secondary data points selected by the data simplification method in the send buffer.

The at least one secondary data capture buffer may comprise a plurality of secondary data capture buffers each storing captured data points of a secondary data type and the machine-executable programming instructions may further configure the telematics device to: in response to storing any selected primary data points in the send buffer: for each current data capture buffer of the plurality of secondary data capture buffers: when a number of data points in the current data capture buffer exceeds a particular threshold, perform the data simplification method on the current data capture buffer even if the current data capture buffer is partially filled; and storing any selected secondary data points selected by the data simplification method in the send buffer.

The machine-executable programming instructions may further configure the telematics device to: in response to storing any selected primary data points in the send buffer: perform the data simplification method on the at least one secondary data capture buffer even if the secondary capture buffer is partially filled; and store any selected secondary data points selected by the data simplification method in the send buffer.

The at least one secondary data capture buffer may comprise a plurality of secondary data capture buffers each storing captured data points of a secondary data type, and the machine-executable programming instructions further configure the telematics device to: in response to storing any selected primary data points in the send buffer: for each current data capture buffer of the plurality of secondary data capture buffers: perform the data simplification method on the current data capture buffer even if the current data capture buffer is partially filled; and store any selected secondary data points selected by the data simplification method in the send buffer.

The machine-executable programming instructions may further configure the telematics device to: transmit data points stored in the send buffer in response to any one of: detecting a send timeout and detecting that the send buffer is almost full.

The machine-executable programming instructions which configure the telematics device to perform the data simplification method on a data capture buffer may comprise machine-executable programming instructions which configure the telematics device to: when there are any points of maximum error having an error distance greater than an acceptable error limit in the data capture buffer: select any points of maximum error having the error distance greater than the acceptable error limit; place all selected points of maximum error in the send buffer; placing a last selected point of maximum error in a first location in the data capture buffer; place a last data point in the data capture buffer as a third data point in the data capture; and place a point of maximum error between the last selected point of maximum error and the last data point, in a second location of the data capture buffer.

The error distance may comprise a vertical distance between a data point in the data capture buffer and a line segment drawn between a first point in the data capture buffer and a last point in the data capture buffer.

The error distance may comprise a perpendicular distance between a data point in the data capture buffer and a line segment drawn between a first point in the data capture buffer and a last point in the data capture buffer.

The machine-executable programming instructions may further configure the telematics device to: when there are no points of maximum error having an error distance greater than an acceptable error limit, keep a first data point of the data capture buffer in a first location thereof.

The machine-executable programming instructions further configure the telematics device to: when the last data point has an estimate error greater than an estimate error threshold, place the last data point in the send buffer.

BRIEF DESCRIPTION OF THE DRAWINGS

Exemplary non-limiting embodiments of the present invention are described with reference to the accompanying drawings in which.

DETAILED DESCRIPTION

Telematics System

Figure 1:
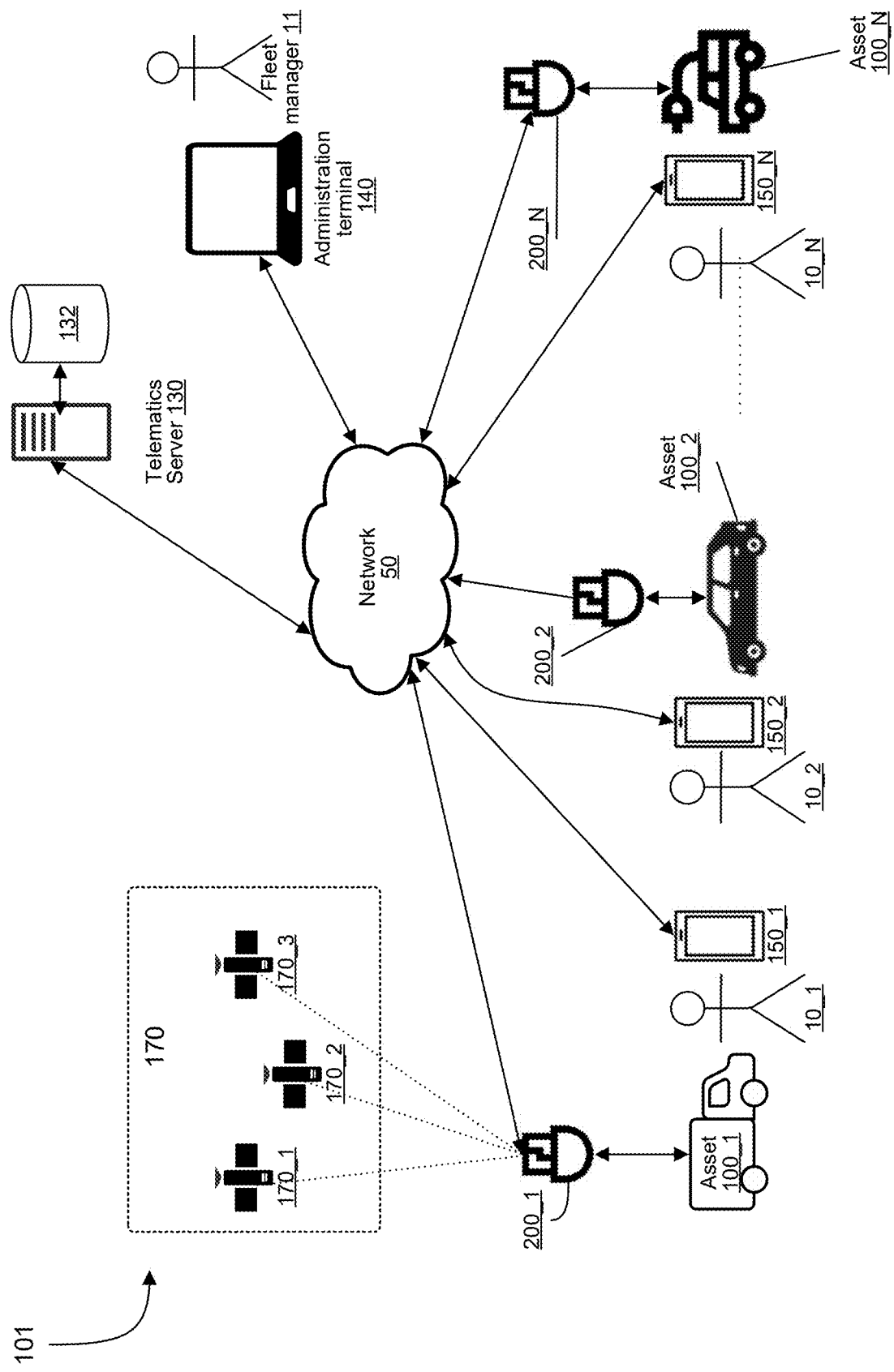
FIG. 1 is a schematic diagram of an exemplary telematics system including a plurality of telematics devices coupled to a plurality of vehicular assets.

A telematics system is a technology that combines telecommunications and informatics to monitor and manage remote assets including vehicles and other equipment. A telematics system may collect data from a high number of assets, either directly or through telematic devices. A telematics device is a hardware component that enables telematics functionality. A telematics device collects and transmits data related to an asset's performance, location, and operating status. A telematics device is either a self-contained telematics device installed at an asset, or an integrated telematics device that is integrated into the asset itself. In either case, telematics data is captured or gathered by the telematics device. FIG. 1 shows a high-level block diagram of a telematics system 101. The telematics system 101 includes a telematics server 130, (N) telematics devices shown as telematics device 200_1, telematics device 200_2 . . . through telematics device 200_N ("telematics device 200"), a network 50, administration terminal 140, and operator terminals 150_1, 150_2 . . . through 150_N ("the operator terminals 150"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("the satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car. The asset 100_N is shown as an electric vehicle (EV). Other types of vehicles, which are not shown, are also contemplated in the various embodiments of the present disclosure, including but not limited to, farming vehicles, construction vehicles, military vehicles, and the like. Most vehicles today use internal combustion engines (ICEs), such as gasoline and diesel engines, which rely on pistons and can operate with either a four-stroke or two-stroke cycle. A less common ICE is the rotary engine. Electric vehicles (EVs) come in several forms, including Battery Electric Vehicles (BEVs), which are fully electric and powered by large battery packs; Hybrid Electric Vehicles (HEVs), which combine an ICE and electric motor with regenerative braking for battery recharging; Plug-in Hybrid Electric Vehicles (PHEVs), which have both an ICE and a larger battery that can be charged externally, allowing for electric-only driving before switching to the engine; Extended-Range Electric Vehicles (EREVs), which are similar to PHEVs but with larger batteries and an onboard gasoline engine acting only as a generator; and Fuel Cell Electric Vehicles (FCEVs), which use hydrogen to produce electricity with water vapor as the only emission. Additionally, solar-powered electric vehicles feature solar panels that generate electricity to assist the vehicle's battery.

While the assets shown in FIG. 1 are all land vehicles, this is not always the case. An asset may also be a marine vehicle or an airborne vehicle employing an ICE, an electric motor, or any other engine such as a jet engine, a rocket propulsion engine, and so on. In some cases, an asset is a stationary machine such as a generator, concrete mixer, compressor, etc.

The telematics devices 200 are coupled to assets 100. For example, in FIG. 1 the telematics device 200_1 is coupled to the asset 100_1. Similarly, the telematics device 200_2 is coupled to the asset 100_2 and the telematics device 200_N is coupled to the asset 100_N. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 130, between the administration terminal 140 and the telematics server 130, and between the operator terminals 150 and the telematics server 130.

In some implementations of the telematics system 101, the network 50 is a cellular network utilizing various cellular technologies. These can include 2G (GSM, GPRS, EDGE), 3G (UMTS, HSPA), 4G (LTE), 5G, or NB-IoT, which is a low-power wide-area network (LPWAN) technology that is part of the 3GPP standard.

In some implementations of the telematics system 101, the network 50 can utilize non-cellular Wide Area Network (WAN) technologies. Examples include WiMAX, based on the IEEE 802.16 standards; LoRaWAN, a low-power WAN protocol; and Weightless, a family of open standard low-power WAN technologies operating in sub-GHz frequency bands.

In some implementations of the telematics system 101, the network 50 uses a wired network technology when the telematics device 200 is coupled to an asset that provides wired network connectivity. Examples of wired network technologies include Ethernet, Fast Ethernet, Local Talk™, Token Ring, Fiber Distributed Data Interface (FDDI), and Asynchronous Transfer Mode (ATM).

In some implementations, the network 50 is a combination of the above-specified technologies.

The telematics server 130 is a computer system (or cluster of computers) responsible for receiving, storing, and analyzing the asset tracking data. The telematics server 130 can run various operating systems or be implemented on a cloud computing platform. The telematics server 130 connects to the network 50 to receive data from the asset tracker and utilizes software modules to analyze this data. The telematics server 130 can store the data and analysis results in a telematics database 132 and communicate information to the administration terminal 140.

The satellites 170 can be part of a global navigation satellite system (GNSS), such as GPS, GLONASS, Galileo, or BeiDou, providing location data. This information is processed by a location module on the telematics device 200 to determine the location of the asset. Alternatively, the asset tracker may use other methods to determine its location.

The administration terminal 140 is an electronic device capable of connecting to the telematics server 130, over the network 50. The administration terminal 140 can be configured to retrieve data and analytics related to one or more of the assets 100; to receive alerts from the telematics server 130 in respect of one or more conditions on the telematics device 200; and/or to issue commands to one or more telematics device 200 via the telematics server 130. The administration terminal 140 is shown as a laptop computer, however, this is not necessarily the case. An administration terminal is any one of: a desktop computer, an industrial human-machine interface (HMI), a touch screen panel, a table, a smartphone, an Augmented Reality (AR) headset, and a Network Operations Center (NOC). In some implementations, the administration terminal 140 runs a web browser or a custom application which allows retrieving data and analytics, pertaining to one or more assets 100, from the telematics server 130 via a web interface of the telematics server 130. In some implementations, the administration terminal 140 is used to issue commands to one or more telematics device 200 via the telematics server 130. In some implementations, an administrator 11 communicates with the telematics server 130 using the administration terminal 140. In addition to retrieving data and analytics, the administration terminal 140 allows the administrator 11 to set alerts and geofences for keeping track of the assets 100, receiving notifications of deliveries, receiving notifications of vehicle conditions, and receiving alerts pertaining to driver behavior.

The operator terminals 150 are electronic devices, similar to the administration terminals 140. The operator terminals 150 are shown as smartphones, however, this is not necessarily the case. An administration terminal is any one of: a desktop computer, an industrial human-machine interface (HMI), a touch screen panel, a table, a smartphone, an Augmented Reality (AR) headset, and a Network Operations Center (NOC). The operator terminals 150 are used by operators 10 (for example, vehicle drivers) of the assets 100 to both track and configure the usage of the assets 100. For example, as shown in FIG. 1, the operator 10_1 has the operator terminal 1501, the operator 10_2 has the operator terminal 150_2, and the operator 10_N has the operator terminal 150_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N.

However, any operator 10 may operate any asset 100 within a particular group of assets, such as a fleet. The operator terminals 150 are in communication with the telematics server 130 over the network 50. The operator terminals 150 may run at least one asset configuration application. The asset configuration application may be used by operator 10 to inform the telematics server 130 that operator 10 is currently operating asset 100. For example, the operator 10_2 may use an asset configuration application on the operator terminal 150_2 to indicate that the operator 10_2 is currently using the asset 100_2. The telematics server 130 updates the telematics database 132 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating.

In operation, a telematics device 200 is coupled to an asset 100 to capture asset data. In some implementations, the asset data is combined with location data obtained by the telematics device 200 from a location module in communication with the satellites 170 and/or sensor data gathered from sensors in the telematics device 200 or another device coupled to the telematics device 200. The combined asset data, location data, and sensor data are termed "telematics data." The telematics device 200 sends the telematics data to the telematics server 130 over the network 50. The telematics server 130 processes, aggregates, and/or analyzes the telematics data to generate asset information pertaining to the assets 100 or to a fleet of assets.

In some implementations, the telematics server 130 stores the telematics data and/or the generated asset information in the telematics database 132. In some implementations, the administration terminal 140 connects to the telematics server 130, over the network 50, to access the generated asset information. In other implementations, the telematics server 130 pushes the generated asset information to the administration terminal 140. In some implementations, the operators 10 use the operator terminals 150 to indicate to the telematics server 130 which of the assets 100 they are associated with. In response, the telematics server 130 updates the telematics database 132 to associate an operator 10 with an asset 100. In some implementations, the telematics server 130 provides additional analytics related to the operators 10 including work time, location, and operating parameters. For example, for vehicle assets, the telematics data may include turning, speeding, and braking information. The telematics server 130 can correlate the telematics data to the vehicle's driver by querying the telematics database 132 for a particular vehicle and retrieving the associated driver information. In some implementations, an administrator 11 uses the administration terminal 140 to set alerts for certain activities pertaining to the assets 100. When criteria for an alert is met, the telematics server 130 sends a message to the administration terminal 140 to notify an administrator 11. In some implementations, the telematics server 130 sends alerts to the operator terminal 150 to notify an operator 10 of the alert. For example, a vehicle driver operating the vehicle outside of a service area or hours of service (HOS) may receive an alert on the operator terminal 150 belonging to that vehicle driver. In some implementations, an administrator 11 uses the administration terminal 140 to configure a telematics device 200 by issuing commands thereto via the telematics server 130. In some implementations, the telematics server 130 sends alerts to the telematics device 200 to generate an alert to the driver such as a beep, a displayed message, or an audio message.

Figure 2:
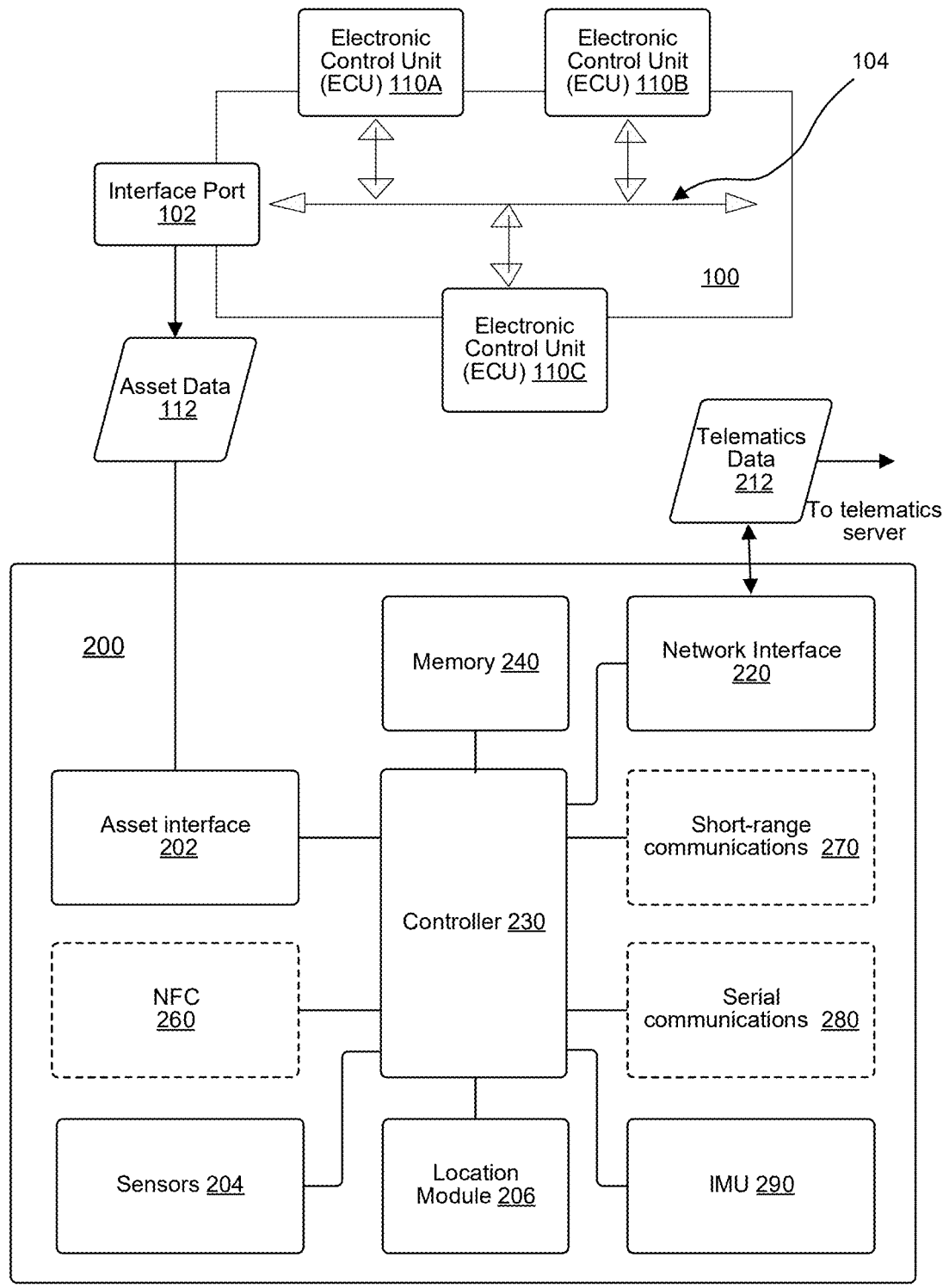
FIG. 2 is a block diagram showing a telematics device coupled to an asset's communications bus via an interface port.

The asset 100 may have a plurality of electronic control units (ECUs) of the above-mentioned types. A vehicle may, for example, have around seventy ECUs. For simplicity, only a few of the ECUs 110 are depicted in FIG. 2. For example, in the depicted embodiment the asset 100 has three ECUs shown as the ECU 110A, the ECU 110B, and the ECU 110C ("the ECUs 110"). The ECU 110A, the ECU 1101B, and the ECU 110C are shown to be interconnected via an asset communications bus.

The most commonly used type of asset communications bus is the Controller Area Network (CAN) bus. CAN is a robust and standardized communication protocol designed for real-time control applications. The CAN bus is a physical bus used to connect various ECUs and sensors, allowing them to exchange data and commands. While the Controller Area Network (CAN) bus is the most common type of asset communications bus used in vehicles for real-time control applications, other types of buses exist, including the Local Interconnect Network (LIN) bus for slower-speed communication, FlexRay for high-performance and safety-critical applications, and Ethernet networks for high-bandwidth data communication in modern vehicles with advanced features. Although this discussion focuses on CAN and related protocols, the methods described can also be applied to these other communication protocols.

As discussed above, the most commonly used type of an asset communications bus is the CAN bus. For example, in FIG. 2 the ECUs 110 are interconnected using the CAN bus 104. The ECUs 110 send and receive information to one another in CAN data frames by placing the information on the CAN bus 104. When an ECU 110 places information on the CAN bus 104, other ECUs receive the information and may or may not consume or use that information.

While various protocols can be used for communication between ECUs over a CAN bus, the most common ones include SAE J1939 for trucks and heavy vehicles and SAE J1979 (OBD-II) for passenger vehicles. Other protocols like UDS, ISO 9141, and KWP2000 also exist, with some automakers like GM and Ford using their own proprietary protocols. More recently, DoIP has emerged as a newer protocol utilizing Ethernet for diagnostics in modern vehicles.

An asset 100 may allow access to information exchanged over the CAN bus 104 via an interface port 102. For example, if the asset 100 is a passenger car, then the interface port 102 is likely an OBD-II port. Data accessible through the interface port 102 is termed the asset data 112. In some implementations, the interface port 102 includes a power interface for providing electric power to a telematics device 200 connected thereto.

Telematics Device

Further details relating to the telematics device 200 and how it interfaces with an asset 100 are shown with reference to FIG. 2. FIG. 2 depicts an asset 100 and a telematics device 200 coupled thereto. Selected relevant components of the asset 100 and the telematics device 200 are shown.

The telematics device 200 includes a controller 230 coupled to a memory 240, an asset interface 202 and a network interface 220. The telematics device 200 also includes one or more sensors 204 and a location module 206 coupled to the controller 230. In some implementations, the telematics device 200 contains an inertial measurement unit, shown as the IMU 290. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some implementations (not shown), the telematics device 200 may have a dedicated power source or a battery. In other implementations, the telematics device 200 may receive power directly from the asset 100, via the interface port 102. The telematics device 200 shown is an example. Some components shown in solid lines may also be optional and may be implemented in separate modules. For example, some telematics devices (not shown) may not have a location module 206 and may rely on an external location module for obtaining the location data. Some telematics devices may not have any sensors 204 and may rely on external sensors for obtaining sensor data.

The controller 230 can be any type of hardware component capable of executing instructions, such as a processor, microcontroller, or ASIC, and may follow various architectures like Von Neumann or Harvard. The controller 230 can be a CISC or RISC processor with a single or multiple cores, and may include internal memory for storing instructions to carry out the described methods.

The memory 240, which can be any type of electronic storage component, including ROM (PROM, EPROM, EEPROM, or Flash), RAM (SRAM and DRAM), FRAM, MRAM, or PCM, stores machine-executable programming instructions and/or data. Coupled to the controller 230 via a memory bus, the memory 240 allows the controller 230 to execute the stored machine-executable programming instructions and access the data to support the described functionality.

The location module 206 determines the location of the telematics device 200. The location data may be in the form of a latitude and longitude, in Universal Transverse Mercator (UTM) coordinates, or any other similar form.

In some implementations, the location module 206 is a GNSS transceiver supporting one or more of the aforementioned GNSS technologies. The location module 206 may be integrated into the controller 230 or coupled to the controller 230 by a serial interface such as the Serial Peripheral Interface (SPI), the Inter-Integrated Circuit (I2C), Universal Asynchronous Receiver Transmitter (UART), Universal Serial Bus (USB), and Secure Digital Input/Output (SDIO).

In other implementations, the location module 206 determines the location of the telematics device 200 from a cellular network using cell tower triangulation. In this case, the location module 206 is a firmware module that computes location based on information received from the network interface 220, which in this case is a cellular modem providing signal measurements from multiple nearby cell towers. The location module 206 uses the signal measurements to estimate the location of the telematics device 200. Location data determined by location module 206 is sent to the controller 230.

The sensors 204, which can be any suitable sensor like a temperature sensor, pressure sensor, or optical sensor, are coupled to the controller 230 via serial, parallel, or bus technologies (such as ISA, EISA, MCA, VESA, PCI, PCI-X, PCMCIA, AGP, and SCSI) and provide sensor data. Some sensors 204 may connect to the controller 230 via a serial link such as a UART, SPI, or I2C. However, some telematics devices may not have any sensors 204, while others may pair with external sensors via a wired or wireless interface.

The asset interface 202 is a hardware component that allows the telematics device 200 to read asset data 112 from the interface port 102 of the asset 100 and also to send vehicle data requests to one or more ECUs requesting asset data. Some vehicle data requests may be in the form of configuration commands that configure the ECUs 110 in a particular way to adjust the performance of the vehicle, for example. In some implementations the asset interface 202 receives power from the asset 100 via the interface port 102 for powering the telematics device 200. In the case of an asset employing a CAN bus 104, the asset interface 202 includes an interface connector and a CAN transceiver. A CAN transceiver converts CAN-level signals at the interface port 102 to digital-level signals that can be read by the controller 230. Conversely, the CAN transceiver also converts digital-level signals output by the controller 230 to CAN-level signals that are sent to the CAN bus 104 over the interface port 102.

The IMU 290, an inertial measurement unit, measures and provides information about the telematics device's motion, orientation, and acceleration, often using components like an accelerometer, gyroscope, magnetometer, and barometer. Some IMUs contain a microcontroller or processor for sensor fusion algorithms or embedded machine learning cores (MLCs) like those in the iNEMO inertial modules by STMicroelectronics™. While some IMUs 290 have a communication interface, some telematic devices may not contain an IMU 290 and instead rely on the location module 206 to determine motion.

The IMU 290 may be integrated into the controller 230 or may be a separate component that communicates with the controller 230 via a parallel interface, a serial interface using any one of the above-mentioned serial technologies, a bus interface using any one of the above-mentioned bus technologies. Alternatively or additionally, the IMU 290 may connect directly to General Purpose Input/Output (GPIO) and/or interrupt pins of the controller 230. The controller 230 can configure the IMU 290 by sending configuration commands thereof.

Additionally, the controller 230 can query the status of the IMU 290 generally or in response to receiving an interrupt signal therefrom.

The network interface 220 can utilize various cellular technologies, including 2G (GSM with GPRS or EDGE), 3G (UMTS with HSPA), 4G (LTE), 5G, or NB-IoT (a LPWAN technology within the 3GPP standard).

The network interface 220 may comprise a WAN modem using non-cellular WAN technologies such as WiMAX™ (based on the IEEE 810.16 family of standards), LoRaWAN™ or Weightless, a family of open standard LPWAN technologies operating in sub-GHz frequency bands.

In some implementations, the network interface 220 uses a wired network technology when the telematics device 200 is coupled to an asset that provides wired network connectivity. Examples of wired network technologies include Ethernet, Fast Ethernet, Local Talk™, Token Ring, Fiber Distributed Data Interface (FDDI), and Asynchronous Transfer Mode (ATM).

The network interface 220 may be integrated into the controller or coupled thereto via a parallel interface, a serial interface using any one of the above-mentioned serial technologies, a bus interface using any one of the above-mentioned bus technologies, or may connect directly to General Purpose Input/Output (GPIO) and interrupt pins of the controller 230.

The network interface 220 allows the telematics device 200 to send/receive data to/from remote devices such as the telematics server 130.

The short-range wireless communications module 270 provides short-range wireless communication capability to the telematics device 200. The short-range wireless communications module 270 comprises one of a Bluetooth™ module, a Wi-Fi™ module, a Zigbee™ module, a Z-Wave module, and an RFID™. These technologies operate on different frequencies (e.g., Bluetooth™ at 2.4 GHz, Wi-Fi™ at 2.4 GHz and 5 GHz, Z-Wave in the sub-GHz range) and offer varying data rates and ranges, with Zigbee™ designed for low-power sensor networks (IEEE 810.15.4 standard). The short-range wireless communications module 270 allows devices, such as external wireless sensors, to communicate with the telematics device 200.

The NFC module 260 is a Near Field Communication (NFC™) module. NFC is a short-range wireless communication technology that enables devices to establish communication and exchange data when they are in close proximity to one other. In some implementations, the NFC module 260 is an NFC reader which can read information stored on an NFC tag. The NFC module 260 can be used to confirm the identity of the operator 10 by having the operator 10 tap an NFC tag onto the telematics device 200 such that the NFC tag is read by the NFC module 260.

The serial communications module 280, a wired communications module, provides serial wired communications to the telematics device 200 and may be a UART, SPI, I2C module, CAN transceiver, or RS-232 transceiver. These modules support various communication protocols, with UART enabling synchronous data transmission at relatively low data rates, SPI allowing full-duplex data exchange, and I2C using a two-wire interface. CAN is commonly used in automotive and industrial applications, and the telematics device 200 may use the serial communications module 280 to connect with external devices using CAN, download the asset data 112, or receive sensor data from external sensors.

In operation, ECUs communicate asset data over the asset communications bus. The telematics device 200 captures asset data 112 over the asset communications bus via the interface port 102. As an example, an ECU 110, such as the ECU 110A, the ECU 110B, or the ECU 110C places CAN data over the CAN bus 104. The CAN data exchanged between the ECUs 110, over the CAN bus 104 are accessible via the interface port 102 and may be retrieved as the asset data 112 by the telematics device 200. The controller 230 of the telematics device 200 receives the asset data 112 via the asset interface 202. In some implementations, the controller 230 receives sensor data from the sensors 204 and/or location data from the location module 206. The controller 230 combines the asset data 112 with the sensor data and the location data to obtain the telematics data 212. The controller 230 transmits the telematics data 212 to the telematics server 130 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some implementations, the telematics device 200 receives, via the network interface 220, commands from the telematics server 130. The received commands instruct the telematics device 200 to be configured in a particular way. For example, the received commands may configure the way in which the telematics device gathers asset data 112 from the asset 100 as will be described in further detail below.

The telematics data 212 may be used to derive useful asset information and analytics, by the telematics server 130.

Integrated Telematics Device

Figure 3:
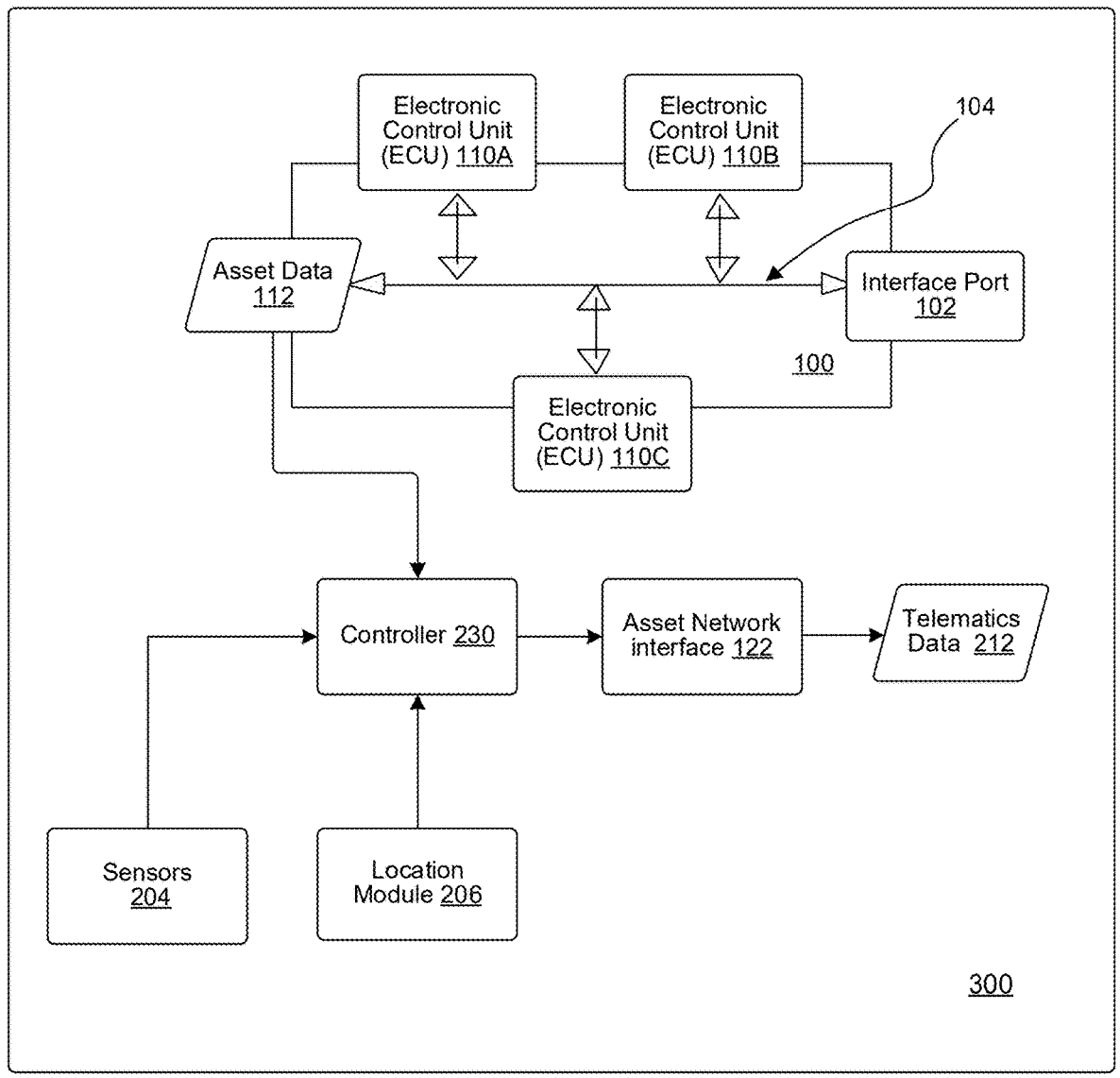
FIG. 3 is a block diagram showing an asset having a telematics device integrated therein.

In the above-mentioned figures, a telematics device 200 is shown as a separate entity connected with an asset 100. The telematics device 200, however, may have its components integrated into the asset 100 at the time of manufacture of the asset 100. This is the case when the asset 100 is a connected car having an asset network interface. For example, with reference to FIG. 3, there is shown an asset 300 with the components of a telematics device integrated therein, in accordance with implementations of the present disclosure. The asset 300 is similar to the asset 100 but, being a connected asset such as a connected car, it has an asset network interface 122 similar to the network interface 220. In the depicted implementation, the controller 230 is directly connected to the asset communications bus, which is a CAN bus 104 and may directly obtain the asset data 112 therefrom. In some implementations, the controller 230 is an ECU running telematics firmware that performs the same functionality as the functionality of the telematics device 200. The sensors 204 and the location module 206 are also integrated into the asset 100 and provide the sensor data and the location data to the controller 230 as described above. The asset network interface 122 belongs to the asset 300 and may be used by the asset 300 to communicate with an original equipment manufacturer (OEM) server, to a roadside assistance server, or for other purposes. The controller 230 may utilize the asset network interface 122 for the transmission of telematics data 212. The asset 300 may have an interface port 102 for connecting other devices other than a telematics device, such as a diagnostic tool including, but not limited to, an OBD-II reader device.

Capturing Asset Data

A telematics device 200 may capture asset data 112 via the interface port 102 of an asset 100 via one of two main methods.

The first method is for the telematics device 200 to listen for broadcast asset data placed by the ECUs 110 on the asset communications bus. For example, for the CAN bus 104, the ECUs 110 may place broadcast asset data in the form of broadcast CAN data frames on the CAN bus 104 that the telematics device 200 can capture over the interface port 102.

The second method is for the telematics device 200 to actively solicit asset data 112 via asset data requests packaged in asset data messages sent to a particular ECU. For an asset employing a CAN bus 104, the telematics device 200 sends asset data requests in CAN data frames sent to an ECU 110. The ECU 110 responds with the requested asset data inside an asset data message directed to the telematics device 200. For an asset employing a CAN bus 104, the ECU 110 sends the asset data 112 packaged in a CAN data frame sent back to the telematics device 200.

Data Simplification

The telematics device 200 may send telematics data 212 as soon as the telematics data 212 is captured, or may send telematics data 212 at regular intervals. Either way if the asset data 112, location data, and sensor data are sent whenever they are captured, the telematics device 200 will be sending so much traffic over-the-air. Meanwhile, some if not most of the data may not be changing or at least not changing significantly. For example, if the engine coolant temperature of a vehicular asset is steady at 88 degrees Celsius for a few minutes, there is practically no value in sending such redundant data every 5 seconds, for example. Moreover, sending redundant data wastes network bandwidth, increases cost, and consumes power as the transceiver of the network interface is unnecessarily powered. As such, using a data simplification method to simplify the captured telematics data 212 can help reduce the amount of telematics data 212 sent over the air, reduces the cost of the network data plan used by the telematics device 200, and lowers the power consumption. Furthermore, the telematics server 130 has fewer data points to process and make inferences therefrom.

Figure 4:
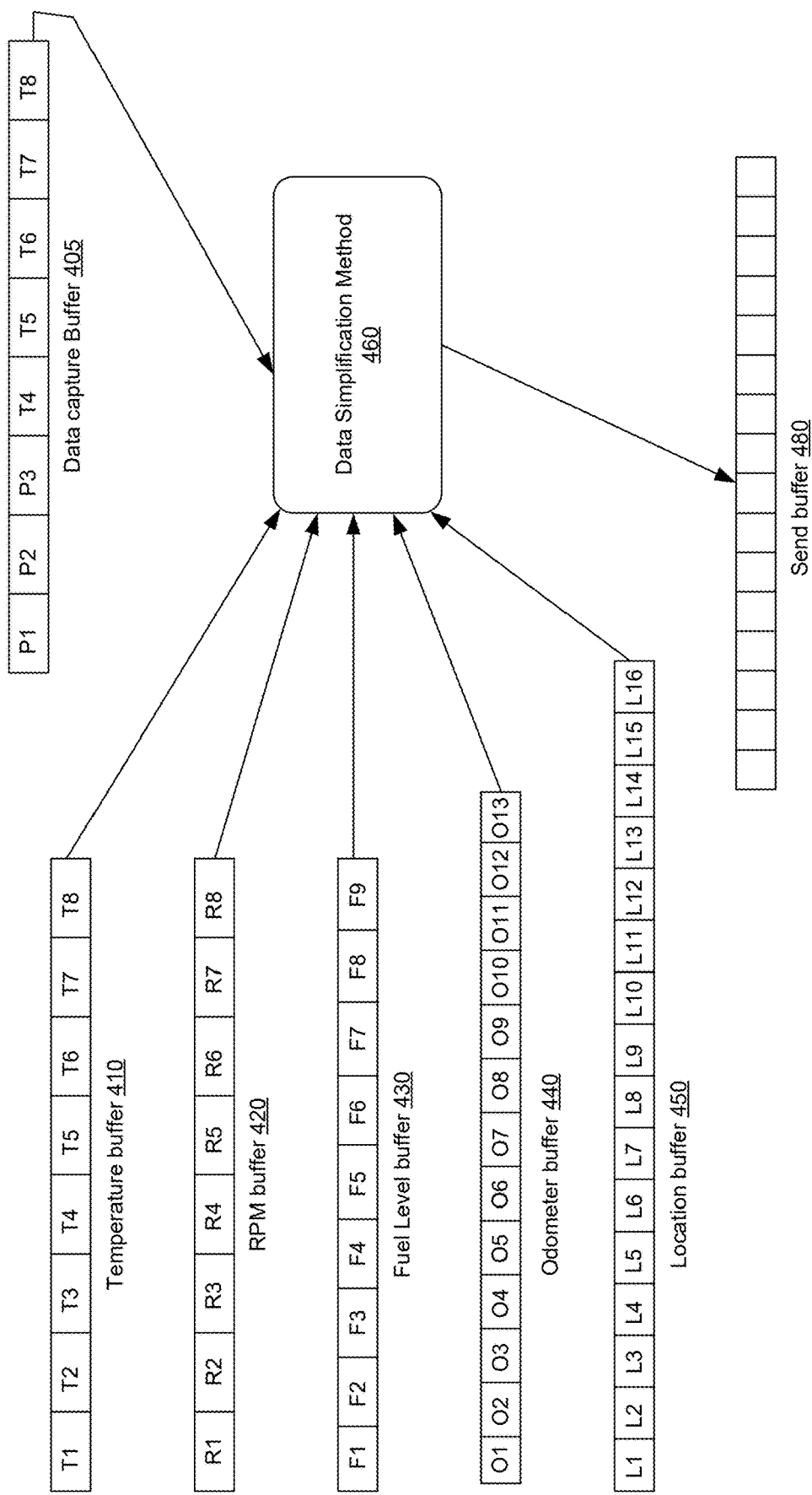
FIG. 4 is a block diagram showing a number of data capture buffers, a data simplification method, and a send buffer.

FIG. 4 depicts a plurality of data capture buffers for storing captured telematics data ("captured data"), a data simplification method 460, and a send buffer 480.

The temperature buffer 410 stores captured engine coolant temperature values.

The temperature values are captured either by an ECU 110 broadcasting the temperature values in broadcast data frames, or by the telematics device 200 querying an ECU that is configured to capture engine coolant data. As shown the temperature buffer 410 can store 8 temperature values shown as T1-T8.

The RPM buffer 420 stores captured revolution-per-minute (RPM) values captured in a manner similar to that of the temperature values. As shown, the RPM buffer can store 8 RPM values shown as R1-R8.

The fuel level buffer 430 stores captured fuel level values captured in a manner similar to that of the temperature values. As shown the fuel level buffer 430 can store 9 values shown as F1-F9.

The odometer buffer 440 stores captured odometer values captured in a manner similar to that of the temperature values. As shown, the odometer buffer 440 can store up to 13 values shown as O1-O13.

The location buffer 450 stores location values captured from a location module 206. Each value is a location in some form, like longitude and latitude. As shown the location buffer 450 can store up to 16 location values shown as L1-L16.

The data capture buffer 405 represents a data capture buffer for storing captured data values of any type. The depicted data capture buffer 405 can store up to 8 values shown as P1-P8.

While FIG. 4 shows a limited number of data buffers, it will be understood by a skilled person in the art that more data types and buffers of different sizes are also contemplated.

Before sending the captured data to the telematics server 130, the telematics device 200 applies a data simplification method 460 to the data captured in the various buffers. The data simplification method 460 yields a simplified data set comprised of fewer data points that are representative of the captured asset and location data. The simplification method stores the simplified data set into the send buffer 480.

A send trigger causes the telematics device 200 to send the contents of the send buffer 480 over the network interface 220 to the telematics server 130.

Data Simplification Algorithm

Each data type in the asset data 112 is in the form of time-series data comprised of a plurality of points each having a value and a timestamp. The data simplification method 460 uses a data simplification algorithm based on the Ramer-Douglas-Peucker ("RDP") algorithm. The RDP algorithm is an algorithm that decimates a curve composed of line segments to a similar curve with fewer points. The RDP algorithm relies on drawing an RDP segment line between a first point and a last point of a series of points on a segment of the curve, measuring the distance between each of the points between the first point and the last point and the RDP segmentline. The point with the largest distance from the RDP segment line is considered the point of maximum error. If the distance between the point of maximum error and the RDP segment line is smaller than a predetermined acceptable error limit (RDP error) then all points between the first point and the last point can be excluded without significant loss of accuracy. Conversely if the point of maximum error is spaced from the RDP segment line by an error distance which is greater than the acceptable error distance (RDP error), then the point of maximum error is selected to be included in the simplified data set that is to be sent to the telematics server 130. The RDP algorithm is recursive. If the point of maximum error is included (because it is greater than the acceptable error limit or distance, i.e., the RDP error), then the RDP algorithm needs to be recursively called on two RDP line segments, namely the first RDP line segment between the first point and the point of maximum error and the second RDP line segment between the first point and the point of maximum error. If a new point of maximum error having an error distance is identified on either the first RDP line segment or the second RDP line segment, and the new point of maximum error has an error distance greater than the acceptable error distance from the respective RDP line segment, then the process repeats as before. The RDP algorithm continues until there are no more points of maximum error which have an error distance from their respective RDP line segments which is greater than the acceptable error distance (RDP error).

FIGS. 5A-5D depict a data simplification method of time-series data that is based on the RDP algorithm. In FIGS. 5A-5D, the data capture buffer 510 stores time-series data captured during the duration 505 and the duration 515. Initially, the data capture buffer 510 stores time series data points P1-P15 captured during the duration 505. The data points are graphically plotted as values versus the time at which each data point was captured. Both the value and the timestamp at which the data value was captured are stored together. The send buffer 480 stores data points selected for sending due to simplifying time-series data types of the asset data 112 using the data simplification method 460. The data simplification method 460 sends the first point of each time series data points at the outset. This establishes an initial value for each data type with the telematics server 130. Then for each data capture buffer 510, when the data capture buffer 510 is full, the data simplification method 460 selects points other than the first point for sending to the telematics server 130 as detailed below.

Figure 5A:
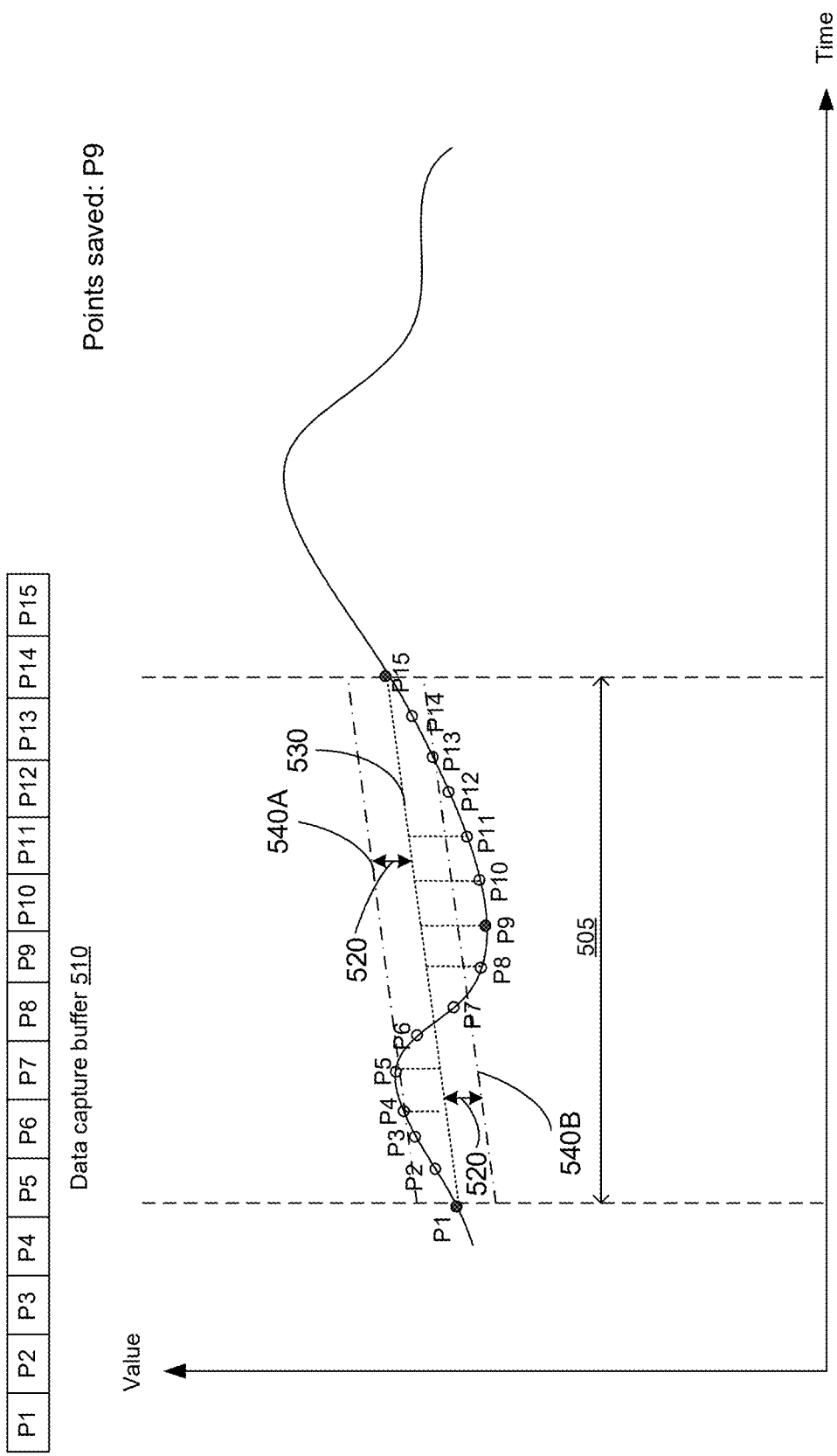
FIG. 5A shows the first iteration of a data simplification method applied to a plurality of data points in a data capture buffer.

First, with reference to FIG. 5A, the first iteration of the data simplification method 460 is applied to the data stored in the data capture buffer 510 during the duration 505. The data simplification method 460 begins by creating an RDP segment line 530 between the first and last points in the data capture buffer 510, i.e. a line between P1 and P15. Next, the data simplification method 460 creates two RDP error lines; the RDP error line 540A and the RDP error line 540B each spaced from the RDP segment line by a distance equal to the RDP error bound 520. Next, the RDP algorithm determines the point of maximum error of all the points between the first point P1 and the last point P15. The point of maximum error is defined as the point that deviates the most from the actual curve if all the points between the first and last points are eliminated. In other words, if the curve between P1 and P15 is approximated by the RDP segment line 530, the point which will have the most difference in value between the actual point value on the curve formed by the data points and the corresponding value (i.e., the value at the same timestamp) on the RDP segment line 530 is the point of maximum error. It should be noted that in the classic RDP algorithm, the distances that are computed between each point on the curve and the RDP segment line are perpendicular distances. However, in this disclosure, the inventors have decided, for simplicity, to use the vertical distance (parallel to the vertical axis) between the point on the curve and the corresponding point on the RDP segment line 530. In FIGS. 5A-5D, such distances are represented by dashed lines extending between the curve formed by the data points and the corresponding points on the RDP segment line 530. However, in FIGS. 5A-5D for points that are within the RDP error line 540A and the RDP error line 540B, the distance line is not drawn so as not to clutter the figures. From FIG. 5A, it can be seen that P9 is the point of maximum error. Next, the data simplification method 460 checks whether the point of maximum error is spaced from the RDP segment line 530 by more than the value of the acceptable error, i.e., the RDP error bound 520. From FIG. 5A it can be seen that the point of maximum error P9 is spaced from the RDP segment line 530 by a distance which is greater than the value of the acceptable error, i.e., greater than the RDP error bound 520 as evidenced by the point of maximum error (P9) being outside the region between the RDP segment line 530 and the RDP error line 540B. As a result, the RDP algorithm determines that the point of maximum error needs to be saved.

The RDP algorithm is a recursive algorithm. Hence, the data simplification method 460, which is based on the RDP algorithm, is a recursive method. Accordingly, once the point of maximum error (e.g. P9) is determined, the point of maximum error divides the curve formed by the plurality of data points into two segments and the RDP algorithm needs to be called recursively on each segment. In other words, the data simplification method 460 has to be applied to the points between the first point (P1) and the point of maximum error (P9), and to the points between the point of maximum error (P9) and the last point (P15).

Figure 5B:
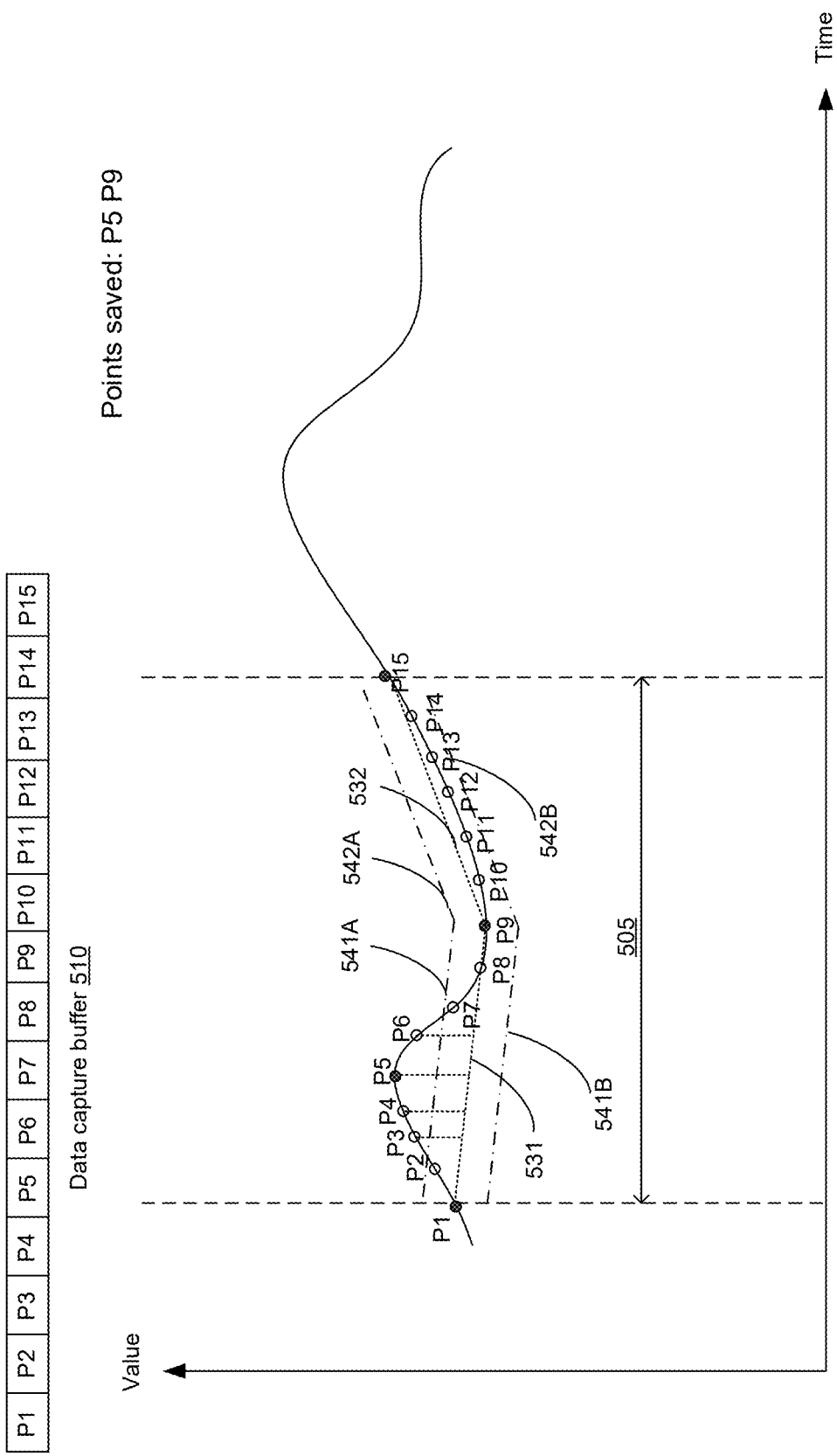
FIG. 5B shows the second iteration of the data simplification method of FIG. 5A applied recursively to two segment lines of the plurality of data points.

With reference to FIG. 5B, the data simplification method 460, based on the RDP algorithm, will now be applied to the points between P1 and P9, and on the points between P9 and P15. Firstly, for the points between P1 and P9, the RDP algorithm extends an RDP segment line 531 between P1 and P9 as well as RDP error lines 541A and 541B around the RDP segment line 531 spaced therefrom by the RDP error bound 520, which is the maximum acceptable error. From FIG. 5B, it can be seen that P5 is the point of maximum error and that it is outside the RDP error line 541A. Therefore the point P5 is also saved. Due to the recursive nature of the RDP algorithm, the RDP simplification algorithm is then applied to the points between P1 and P5 as well as the points between P5 and P9 as well as being applied to the points between P9 and P15. This is shown briefly with reference to FIG. 5C.

Figure 5C:
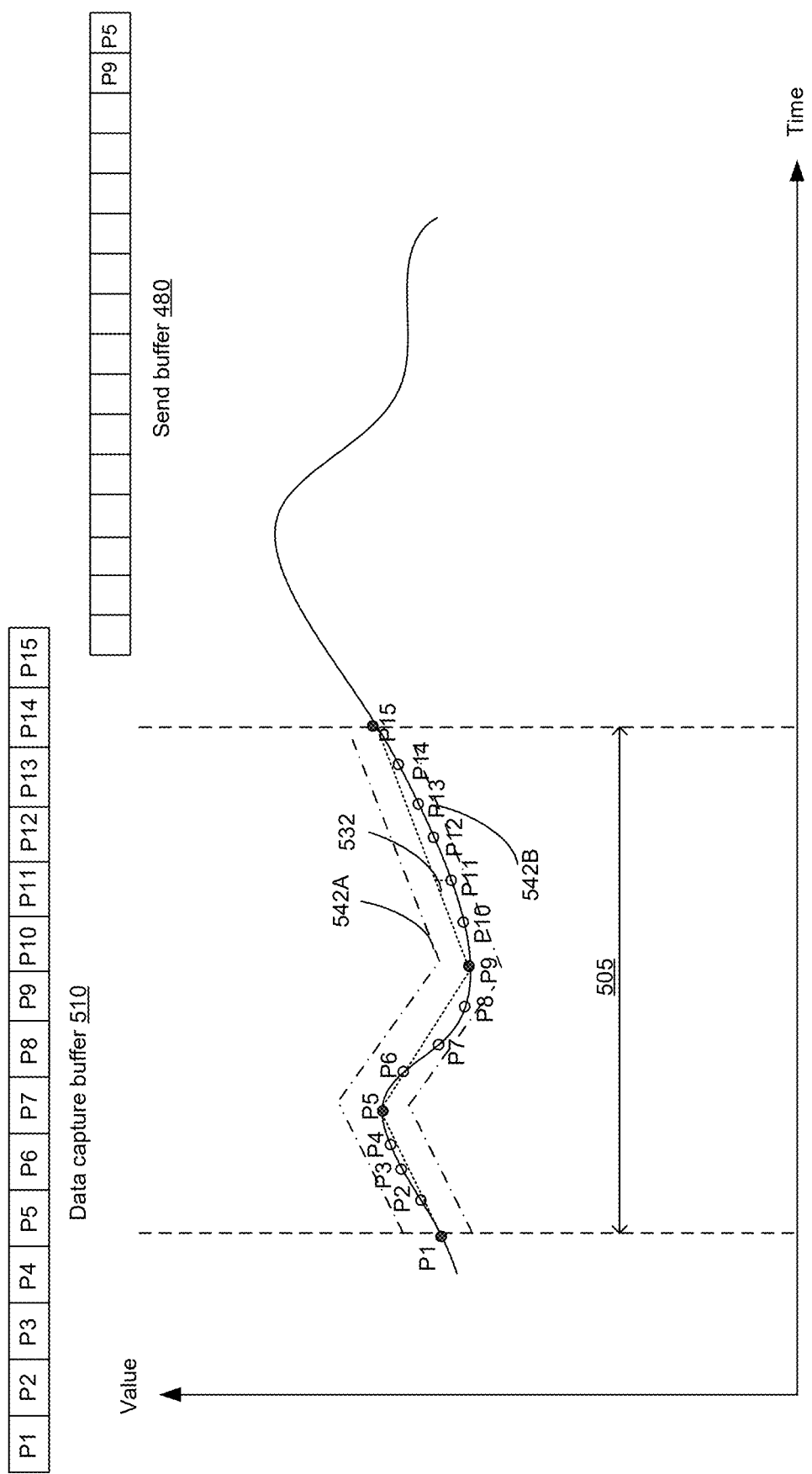
FIG. 5C shows the third iteration of the data simplification method of FIG. 5A applied recursively to more segment lines of the plurality of data points.

By visual inspection of FIG. 5C it can be seen that any point of maximum error between P1 and P5 will be so close to the RDP line segment drawn between P1 and P5. Similarly, any point of maximum error between P5 and P9 will be so close to the RDP segment line drawn between P5 and P9. Hence, no more points of maximum error between P1 and P9 are saved. At this point, the RDP algorithm stops processing the points between P1 and P9. The RDP algorithm now proceeds to the points between P9 and P15. An RDP segment line 532 is drawn between P9 and P15. RDP error lines 542A and 542B are drawn around the RDP segment line 532 and spaced therefrom by the RDP error bound 522. From FIG. 5B and FIG. 5C, it can be seen that all the points between P9 and P15 are also within range of the RDP error line 542A and the RDP error line 542B. Hence, no points of maximum error between P9 and P15 are saved.

Figure 5D:
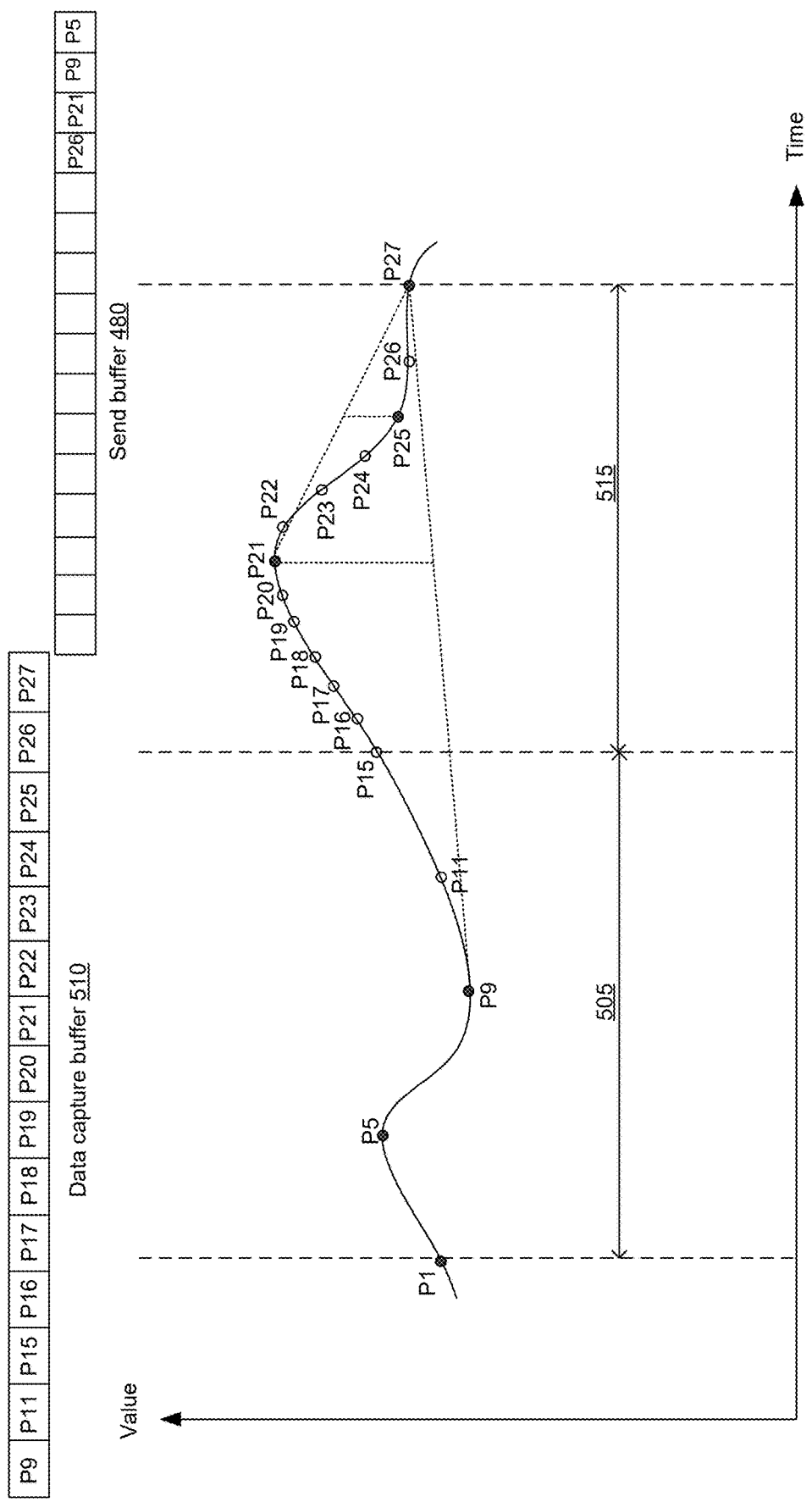
FIG. 5D shows the data simplification method of FIG. 5A applied to a second plurality of data points in the data capture buffer.

At this point, the data simplification method 460 decides which points to place in the send buffer 480 and which points are placed in the data capture buffer 510 before the points captured in the next duration, which is the duration 515 are placed in the data capture buffer 510. As mentioned above, the very first point captured (P1) is sent only for the first duration. Subsequently, it is always assumed that the first point has already been sent, and it will be clear why shortly. The data simplification method 460 places the saved points in the send buffer 480. As indicated above, there are two points of maximum error that have an error greater than the acceptable error, which are the points P5 and P9. Chronologically, with reference to the timestamp of each data point, the point P5 is placed first as it is earlier than the point P9. Hence the saved points are placed in the buffer chronologically in an ascending order or earliest to latest. The last saved point of maximum error is hence the point P9. Next, the data simplification method 460 determines which points are placed in the data capture buffer 510 before capturing new data in the data capture buffer 510. The first point placed in the data capture buffer 510 is the last point of maximum error saved. Therefore, as shown in FIG. 5D, the data capture buffer has P9 in the first location thereof. The next two points to place in the data capture buffer 510 are the last point of the data capture buffer from the duration 505, and the point of maximum error before that point. With reference to FIG. 5C, the point of maximum error between the last saved point of maximum error (P9) and the very last point in the data capture buffer 510 (P15), is the point P11. Therefore, the points P11 and P15 (in chronological order) are placed in the data capture buffer after the last saved point of maximum error (P9). Therefore, as shown in FIG. 5D, the data capture buffer 510 starts with P9, P11, and P15. Since P9 is already in the send buffer 480, it can be understood now why the data simplification method 460 does not include the first point in the data capture buffer 510 in the saved points placed in the send buffer 480.

With reference to FIG. 5D, it can be seen that the RDP algorithm used in this disclosure has run the RDP algorithm on the points P9-P27 and concluded that the points P21 and P25 are points of maximum error, which have an error greater than the RDP error bound 520. As such, the data simplification method has placed the determined points of maximum error in the send buffer 480. As before, the last point of maximum error selected for sending becomes the first point in the data capture buffer 510, followed by the last point (P27) and including the point of maximum error between these two points, which in this case is P26. The method continues until the telematics device 200 ceases to capture asset data 112 and/or sensor data, for example because the asset has been turned off is stationary.

Send Buffer Size Effect

A factor to consider in relation to the data simplification method 460 described above is the tradeoff between latency and transmission cost. In one implementation, the data simplification method 460 may be configured to send any simplified data point, i.e., a selected point of maximum error directly using the network interface 220 instead of placing it in the send buffer 480 for later transmission. In this case, the telematics server 130 will receive the simplified data points from the telematics device 200 with a low latency as the simplified data points are sent as soon as the data simplification algorithm processes the data capture buffer 510. However, the telematics device 200 will need to have the network interface 220 powered up to be able to send the data points as soon as each point is selected from the data capture buffer 510 by the data simplification algorithm of the data simplification method 460. This leads to increased power consumption by the telematics device 200 as powering up the network interface 220 or keeping the network interface 220 powered up consumes a significant amount of electrical power. Another consideration is the network usage. Sending any telematics data 212 comes with an overhead of establishing a connection with the telematics server 130 and encapsulating the simplified data points in layers of communication protocols. To do so with every simplified data point that is selected to be sent results in inefficient use of networking resources. In other implementations, the selected points of maximum error are placed in the send buffer 480 and are only sent when the send buffer 480 is full. In this implementation, the network interface 220 is only powered up when the send buffer 480 is full. This leads to low power consumption, and more efficient use of networking resources as more data points are grouped together and sent in the same protocol layer over an established connection with the telematics server 130 thus resulting in less overhead. However, this latter implementation has a high latency in getting the data points to the telematics server 130 as the data points can remain in the send buffer 480 for seconds and possibly minutes, depending on the size of the send buffer 480. A small send buffer 480 size lowers the latency but increases the power consumption and networking resources usage as the network interface 220 is powered up more frequently. Conversely, a large send buffer 480 increases the latency but lowers the power consumption and network resources usage. A compromise between the aforementioned approach can be accomplished by utilizing data send triggers and a timeout mechanism.

Using Triggers and Timeout

Figure 6:
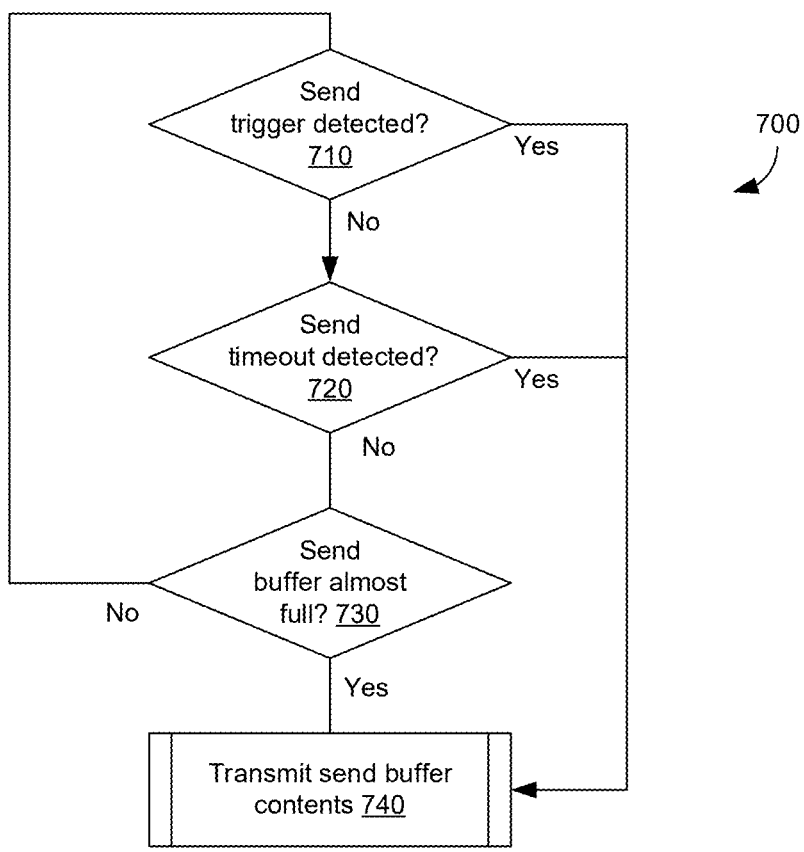
FIG. 6 is a flowchart of a simplified method of transmitting the contents of the send buffer based on a number of trigger events.

The aforementioned considerations relating to the send buffer 480 can be addressed by having a data send trigger and a timeout mechanism. FIG. 6 depicts a method 700 for initiating transmitting the contents of the send buffer 480.

The method 700 begins at 710, where the telematics device 200 checks for a send trigger event. In some implementations, a send trigger event comprises detecting that the send buffer 480 is full. In other implementations, a send trigger event comprises detecting that a data point value of a particular data type has been placed in the send buffer 480. In other implementations, a send trigger event comprises receiving a send trigger request from a remote device such as the telematics server 130, the administration terminal 140, or the operator terminal 150. If a send trigger event is detected, then control goes to step 730. If a send trigger event is not detected, then control goes to step 720.

At step 720, the telematics device 200 checks whether a send timeout event has been detected. A send timeout event comprises an expiry of a timer on the telematics device 200. The send timeout event is intended to prevent excessive delay in sending the contents of the send buffer 480 if no send trigger is detected at step 710. A timer of the telematics device 200 may be set after the contents of a send buffer 480 are transmitted to the telematics server 130. For example, the timer may be set to expire after 1 minute or 2 minutes to prevent data from remaining stale in the send buffer 480 more than that set duration. If the send timeout event is detected, control goes to step 740. If the send timeout event is not detected, then control goes to step 730.

In the event that multiple data points are placed in the send buffer 480 up to the point that the send buffer 480 becomes almost full or completely full, the contents of the send buffer 480 are transmitted. By "almost full", it is meant that the send buffer has been filled up to a particular fill threshold, such as 80% or higher. For example, in step 730 the telematics device 200 checks whether the transmit buffer is 80% full or 90% or whether there are only 1-7 empty spaces left in the send buffer 480. Any of the aforementioned conditions implies that the send buffer 480 is almost full. If the send buffer 480 is almost full, then control goes to step 740. If the send buffer 480 is not almost full, then control goes back to step 710. Alternatively, the telematics device 200 could also wait until the send buffer 480 is completely full and transfers control to step 740.

At step 740, the telematics device 200 powers up the network interface 220 and transmits the contents of the send buffer 480 over the network interface 220 to the telematics server 130. Additionally, the telematics device 200 flushes the contents of the transmit buffer 480.

Primary Data as a Send Trigger

Figure 7A:
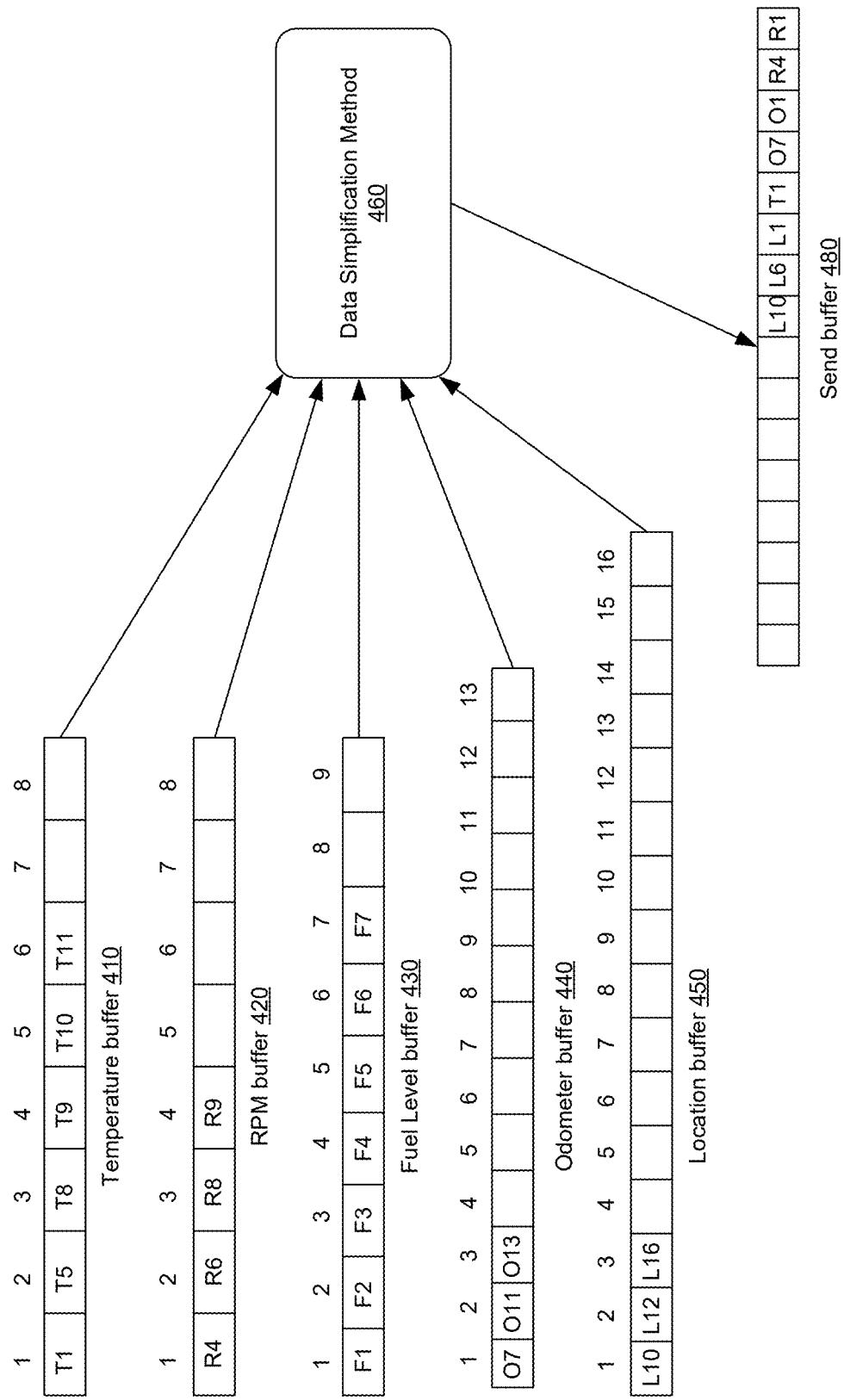
FIG. 7A depicts the contents of data capture buffers and that of a send buffer subsequent to a first instance of data simplification of the primary data capture buffer which is a location buffer.

The data simplification method described with reference to FIGS. 5A-5D referred to a single data type. However, as shown previously in FIG. 4, the telematics device 200 deals with a number of data types each having a data capture buffer associated therewith. In some implementations, the telematics device 200 prioritizes one or more data types and designates such data types as primary data types. In this disclosure, a primary data type is a type of asset data or sensor data that the telematics server 130 is most interested in getting with real-time or near real-time latency. Other data types are considered secondary data types. The telematics device 200 may generate a send trigger event when data points of the primary data type are placed in the send buffer 480 so that the telematics server 130 receives the data points of the primary data type with real-time or near real-time latency. FIG. 7A is a non-limiting example of an implementation in which the telematics device 200 considers location data to be a primary data type and considers all other types of asset data to be secondary data types. With reference to FIG. 7A, consider that the location data is the primary data type and all other types of asset data, i.e., temperature, RPM, fuel level, and odometer to be secondary data types.

An observation of the send buffer 480 reveals that there are two RPM values R1 and R4 while the RPM buffer 420 has the RPM readings R4, R6, R8, and R9. Referring to the prior example, the data simplification algorithm has simplified the RPM points R1-R8, selecting the first point R1 (since that is the very first time RPM data is received) and the point of maximum error (R4) for placement into the send buffer 480. Then the point of maximum error R4 is placed into the RPM buffer 420 as the first point. The last point R8 is also placed into the RPM buffer 420 along with the point of maximum error (which is below the RDP error bound 520) between the selected point of maximum error (R4) and the last point in the buffer R8. The telematics device then captures the RPM point R9 and places it after the 3 points R4, R6, and R8.

The send buffer 480 also contains two odometer values O1 and O7. O1 is included in the sent buffer 480 solely because it is the very first odometer value since ignition has been turned on. O7 is included because it was the point of maximum error amongst the first 13 odometer points, which has an error greater than the RDP error. The odometer buffer 440 has the point of maximum error O7, the last point in the first instance of the odometer buffer 440, i.e. O13, and the point of maximum error, which has an RDP error smaller than the RDP error bound, i.e., O11.

For temperature data, the send buffer 480 only contains a single temperature data value, T1, which was the very first temperature reading since ignition. Since no other temperature values are placed in the send buffer 480, then it can be concluded that for the temperature points T1-T8, there were no points of maximum error having an RDP error greater than the RDP error bound. As such, the temperature buffer 410 contains T1, which is the only point placed in the send buffer 480. The temperature buffer 410 also contains the last point of the first instance of the temperature buffer 410, i.e., T8, and the point of maximum error between T1 and T8, which is a point of maximum error having an RDP error smaller than the RDP error bound.

For fuel data, it can be seen that the fuel level buffer 430 has fuel data points F1-F7 thus indicating that the fuel level buffer 430 has not yet filled up and consequently has not yet undergone any data simplification. Hence, there are no fuel level data points in the send buffer 480. As a result, the telematics server 130 does not have any recorded value for fuel level up to this point.

Figure 9:
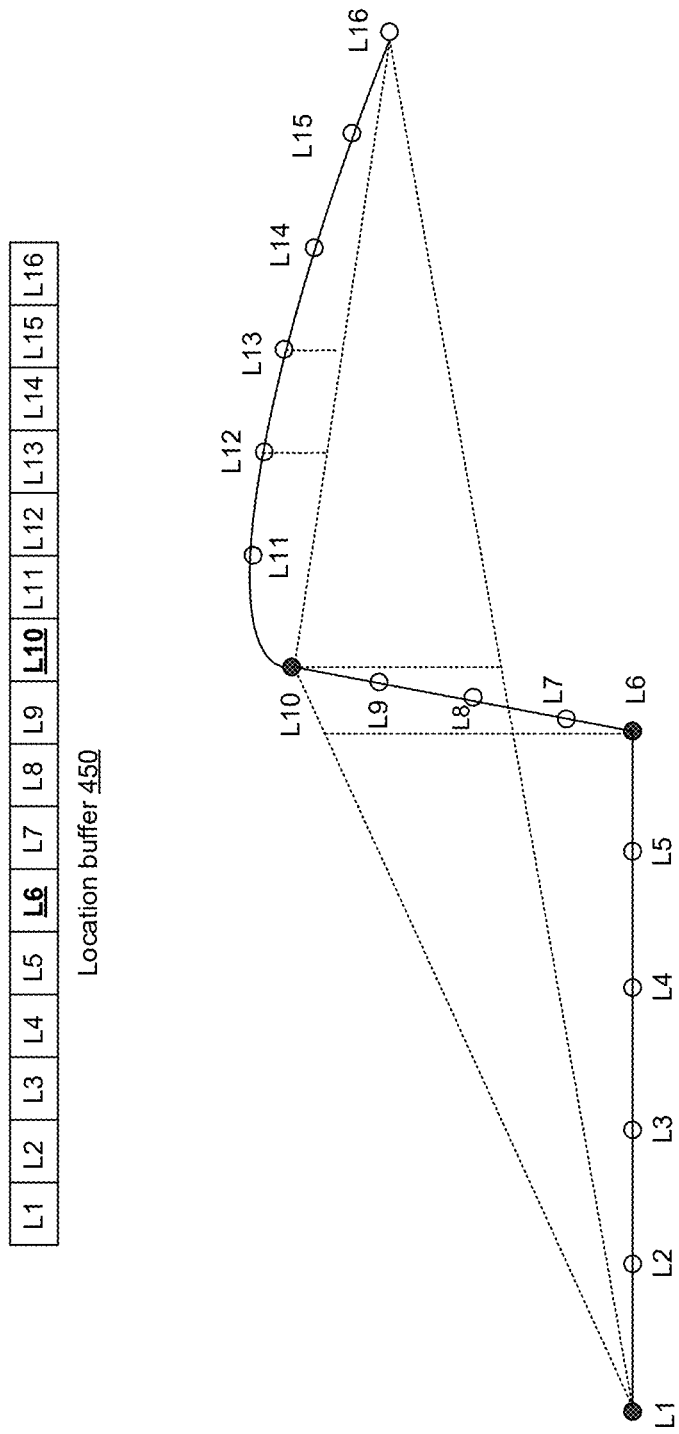
FIG. 9 depicts exemplary location data for a travelling asset, and the simplification of the location data.

For location data, the data reflects deviation from a particular heading. Whenever an asset makes a significant deviation, such as a 90 degree turn, this represents a deviation from the heading. Typically the point of maximum error is the point at which the asset made the turn. For example, with reference to FIG. 9, the points L1-L16 represent the headings of an asset. Between L1 and L6, the asset is going in the same heading. At L6, the asset changes heading (by making a left turn) and then continues in the same heading, until L10. At L10, the asset changes heading (by making a right turn). The data simplification algorithm identifies L10 and L6 as the points of maximum error that need to be saved. Turning back to FIG. 7A, the send buffer contains L1 (since this is the first location ever since the vehicle has been turned on), followed by L6 and L10. As for the location buffer 450, it contains the last saved point of maximum error, which is L10, the last point L16, and the largest point of maximum error between the last saved point of maximum error (10) and the last point (L16), which is L12.

New location points can be stored in the location buffer after the last point (L16). FIG. 7A shows all buffers at the point where the primary data type capture buffer, in this case the location buffer 450 has undergone a data simplification and the telematics device 200 is ready to send out the contents of the send buffer 480.

Since the location data has been designated the primary data type, the placement of the location points L1, L6, and L10 into the send buffer 480 constitutes a send trigger, per step 710 of FIG. 6. Hence, the telematics device 200 sends the contents of the send buffer 480 over the network interface 220 to the telematics server 130.

Figure 7B:
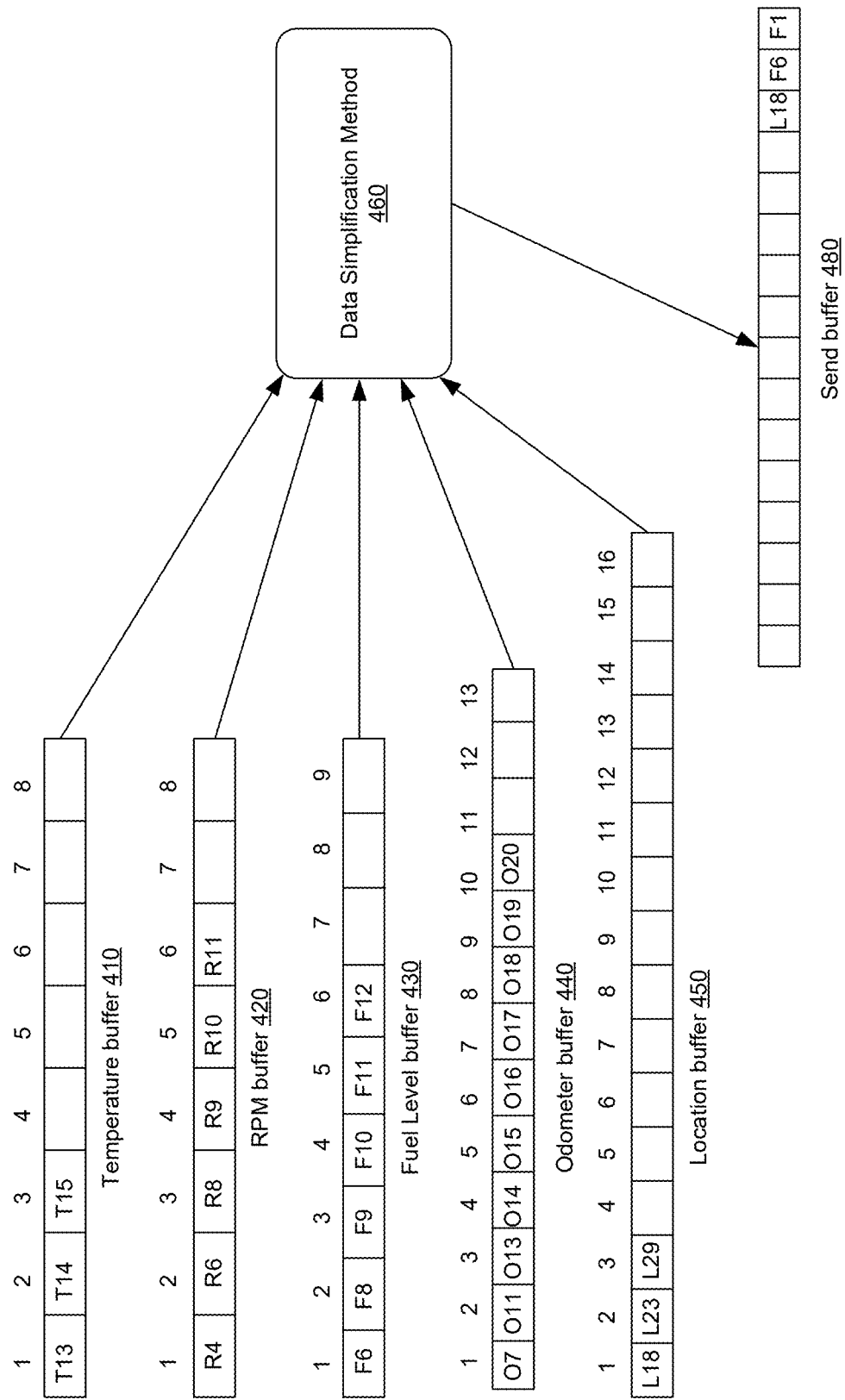
FIG. 7B depicts the contents of data capture buffers and that of a send buffer subsequent to a second instance of data simplification of the primary data capture buffer which is a location buffer.

The telematics device continues capturing data, and the capture buffers may look as shown in FIG. 7B. For the temperature, FIG. 7B shows that the temperature buffer 410 now contains T13, T14, and T15. Additionally, the send buffer 480 contains no temperature data points. This indicates that when the temperature buffer 410 became full (i.e., containing T1, T5, T8, T9, T10, T11, T12, and T13), the data simplification algorithm did not detect any points of maximum error that had an error above the maximum allowable error (i.e., the RDP error bound). Hence no temperature points were placed in the send buffer 480, and only the last point T13 was placed in the temperature buffer 410. It is worth noting that the telematics server 130 only received T1 from the telematics device 200. The telematics server 130 cannot make any inference about the temperature since the timestamp of T1.

For RPM data, the RPM buffer 420 has only added two data points R10 and R11 over the data points stored therein in FIG. 7A. Accordingly, no data simplification is done to the RPM buffer 420 since it is not yet full. As a result, the telematics server 130 cannot make any inference about the RPM since the timestamp of the last RPM data point the telematics server 130 has received, which is R4.

For fuel data, the fuel level buffer 430 has F6, F8, F9, and F10-F12. The send buffer 480 contains F1 and F6. This indicates that the data simplification algorithm identified F6 as the point of maximum error that exceeds the RDP error bound, which is why it is in the send buffer 480. As before, F1 is placed in the send buffer 480 since it is the very first fuel level point captured. The fuel level buffer 430 has F6, the point of maximum error selected for sending, the last point (F9) and the point of maximum error between F6 and F9, which is F8. The points F10-F12 are newly captured fuel level values placed in the fuel level buffer 430 after the 3 points from the previous instance of the buffer (F6, F8, and F9).

For odometer data, the odometer buffer 440 has more data points (O14-O20) in FIG. 7B compared to FIG. 7A, but it has not filled up yet to trigger a data simplification thereof. As such, no odometer data points are placed into the send buffer 480. Consequently, the telematics server 130 does not receive any odometer data points since it has received O7, and the telematics server 130 cannot make any assumptions as to the current value of the odometer for the asset coupled to the telematics device 200.

For the location data, the point L18 is the only point of maximum error that has an RDP error greater than the RDP error bound. Hence L18 is placed in the send buffer 480 and as the first point in the location buffer 450. The location data point L29 was the last point in the location buffer 450 before simplification, and L23 is the point of maximum error between L18 and L29.

Figure 8:
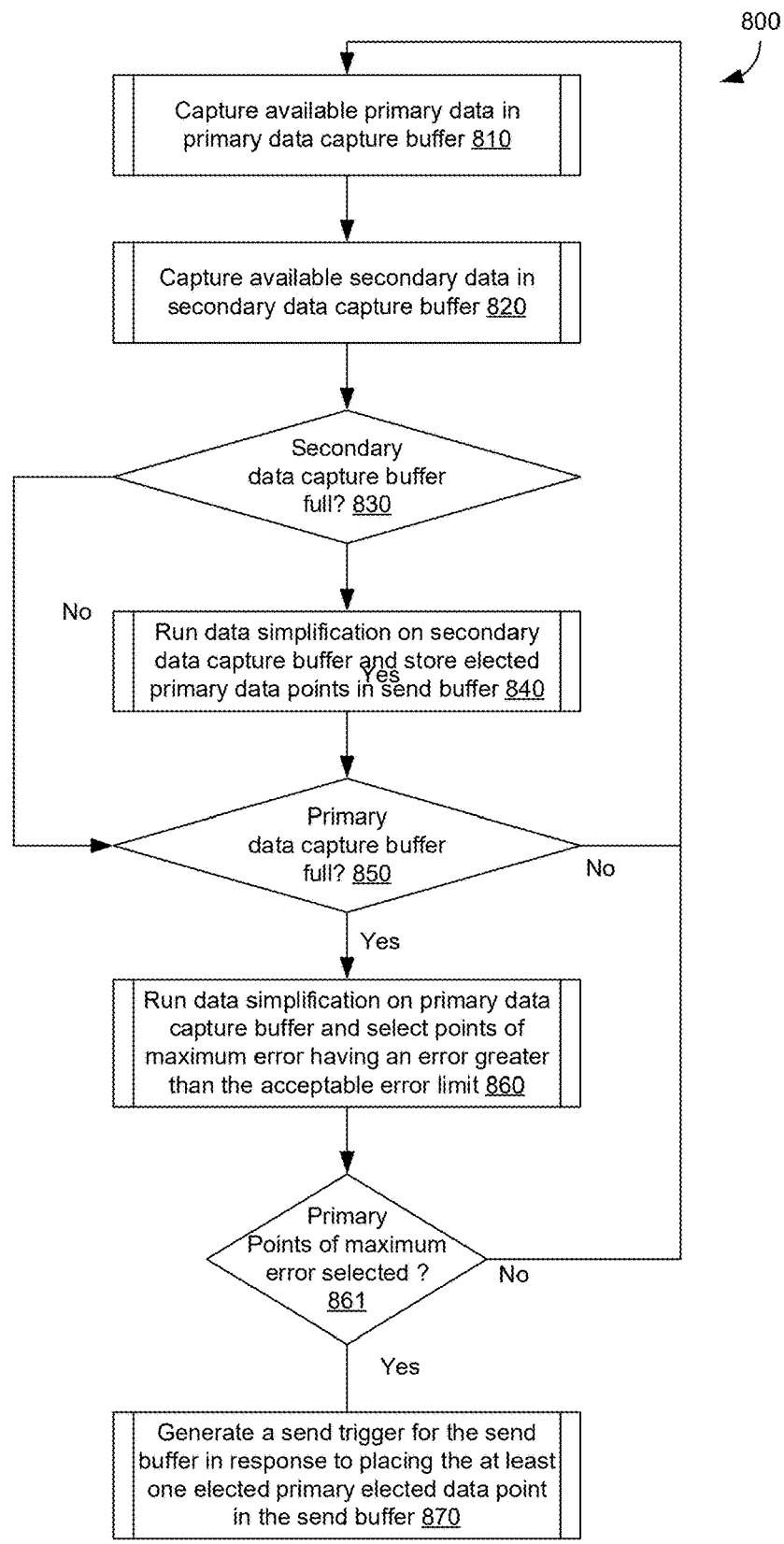
FIG. 8 is a flowchart of a method of capturing, simplifying, and sending data, in accordance with embodiments of the present disclosure.

FIG. 6 described above showed a method for transmitting the contents of the send buffer 480 that includes receiving send triggers. FIG. 8 depicts a method 800 of data simplification of a first data capture buffer for capturing data of a primary data type, and a second data capture buffer for capturing data of a secondary data type. In the method 800, a send trigger is generated as explained below. In FIG. 7A and FIG. 7B there was one primary data type, which was location data, and the remaining data types were secondary data types. FIG. 8 discusses a single primary data type and a single secondary data type for simplicity only. There may be more than one primary data type and more than one secondary data type. A person skilled in the art can generalize the method 800 for multiple primary data types and multiple secondary data types. Method 800 starts at step 810. At step 810, the telematics device 200 captures one or more than one primary data points in a primary data capture buffer. As an example, the telematics device 200 can capture one or more location data points from a location module, such as a GPS. The telematics device 200 can store the captured location data point in the location buffer 450, which is the data capture buffer for the location data.

At step 820, the telematics device 200 captures one or more secondary data points and stores the one or more secondary data points into a secondary data capture buffer. For example, the telematics device 200 can capture one or more data points of asset data 112 from an ECU 110 of an asset 100 over the interface port 102 of the asset 100 via the asset interface 202. The secondary data points can be temperature data, RPM data, fuel level data, odometer data, or any other data captured from the asset. The secondary data points may also be sensor data points captured from sensors paired to or coupled with the telematics device 200. The telematics device 200 stores the captured secondary data into a secondary data capture buffer, such as the temperature buffer 410, the RPM buffer 420, the fuel level buffer 430, the odometer buffer 440, or any other data capture buffer corresponding to a secondary data type include asset data and sensor data types.

At step 830, the telematics device 200 checks whether the secondary data capture buffer is full. As shown in the various figures, such as FIG. 4, FIG. 7A, and FIG. 7B, the different secondary data capture buffers have different sizes based on the type of data each buffer holds. When a secondary data capture buffer is full, control goes to step 840. If no secondary data capture buffer is full, control goes to step 850.

At step 840, the telematics device 200 knows that a particular secondary data capture buffer is full. The telematics device runs a data simplification method 460 on the secondary data capture buffer. Due to running the data simplification method 460, one or more points are selected to be stored into the send buffer 480. As discussed above, running an RDP simplification can yield at least the first point to be copied to the send buffer 480. Additionally, any points of maximum error which are greater than a maximum error threshold, such as an RDP error threshold, are also selected for copying to the send buffer.

At step 850, the telematics device 200 checks whether the primary data capture buffer is full. When the primary data capture buffer is not full, control returns back to capture more primary and secondary data, by going back to step 810. When the primary data capture buffer becomes full, control goes to step 860.

At step 860, the telematics device 200 runs the data simplification method 460 on the contents of the primary data capture buffer, selecting any points of maximum error having an error greater than the acceptable error threshold.

At step 861, the telematics device 200 checks whether running the data simplification method 460 has yielded one or more points of maximum error of the primary data type. When the data simplification method 460 has determined that the primary data points stored in the primary data capture buffer do not contain any points of maximum error having an error greater than the error threshold, control goes back to step 810. Alternatively, which are selected to be copied to the send buffer 480. Alternatively, when the data simplification method 460 has determined that the primary data points stored in the primary data capture buffer contain at least one point of maximum error having an error greater than the error threshold, then a least one primary point of maximum error is selected for copying into the send buffer 480.

At step 870, the placement of one or more points of the primary data type into the send buffer 480 serves as a send trigger. Hence, when one or more points of the primary data type are placed into the send buffer 480, the telematics device 200 transmits the send buffer contents as mentioned with reference to step 740 of the method 700 depicted in FIG. 6.

The method 800 of FIG. 8 is to be understood in conjunction with the method 700 of FIG. 6. Specifically, as can be seen in FIG. 8, if the data simplification method 460 does not select any points of maximum error of the primary data type, control goes back to step 810. Where this to continue happening, no send trigger is generated to cause the contents of the send buffer 480 to be sent. However, in accordance with the method 700 of FIG. 6, the contents of the send buffer 480 may still be transmitted if a send timeout condition is detected or if the send buffer 480 becomes full.

As described above, the data simplification method 460 uses the primary data type (which in this case is the location data) as a send trigger to trigger sending the contents of the send buffer 480. This reduces the number of transmissions from the telematics device 200 thus conserving power and optimally utilizes the networking resources. However, there are some shortcomings that need to be addressed.

Telematics Server Cannot Infer Information about Missing Data Types in Send Buffer In the data simplification method depicted in FIG. 7A and FIG. 7B, and described with reference to the flowchart of FIG. 8, the telematics server 130 cannot infer whether the value of the secondary data type has changed unless a value from the secondary data type was in the send buffer 480 at the time that the contents of the send buffer 480 are sent to the telematics server 130. This is because the data simplification method is only run on the secondary data capture buffer when the secondary data capture buffer is full. If one compares the capture buffers for temperature and odometer in FIG. 7A and FIG. 7B, an issue arises. The temperature buffer 410 has undergone a first data simplification as the buffer filled up with T1-T8, then when the simplification algorithm was applied to the full temperature buffer, there were no points of maximum error. Hence only T1 was placed in the send buffer 480. The temperature buffer 410 then filled up again when the contents thereof contained T1, T5, and T8 (from the first simplification step) and the temperature data points T8-T13. However, when a second data simplification of the temperature buffer 410 took place, there were no points of maximum error. Hence, the temperature buffer 410 contained only the last point T13, and no points of maximum error were placed in the send buffer 480. Now if one considers the odometer buffer 440, it can be seen that between FIG. 7A and FIG. 7B, the odometer buffer did not become full and hence no data simplification is performed and no odometer data points have been placed in the send buffer 480. In conclusion, the telematics server 130 cannot tell whether the absence of a particular data type in the transmission of the send buffer 480 contents is due to the corresponding capture buffer not being full or is due to the capture buffer not containing any points of maximum error having an error distance greater than the acceptable error limit. As such the telematics server 130 cannot make an assumption as to the value of any of the absent data types. However, had the telematics server 130 known that the temperature had undergone a data simplification, then the telematics server 130 could determine that the absence of a temperature in the received contents of the send buffer 480 indicates that the temperature has not changed significantly from the last received temperature point from the telematics device 200.

Data is Delayed Due to Running Simplification Only on Full Data Capture Buffers

It can be observed in FIG. 7A and FIG. 7B that some data capture buffers, while not completely full, are close to being full. For example, in FIG. 7A, the fuel level buffer 430 has 7 out of 9 spaces thereof containing data points. Yet no data simplification is triggered on this buffer since it is not completely full. As a result, the send buffer 480 in FIG. 7A contains no fuel level data. The same applies to the RPM buffer 420 and the odometer buffer 440 in FIG. 7B. Therefore, in this implementation, it is expected that the data points in the partially filled data capture buffers will take some time before they are sent. Specifically, the data will remain in the data capture buffer until the data capture buffer becomes full. When the data capture buffer becomes full the selected data points are placed into the send buffer 480. This causes a latency in delivering the secondary type data points to the telematics server 130. For example, consider the fuel level point F1 that is not sent in the send buffer 480 of FIG. 7A and has to wait until the contents of the send buffer 480 of FIG. 7B to be sent to the telematics server 130.

In some applications, it is not ideal to delay sending some types of data. For example, there may be a case where the telematics server 130 needs the temperature and/or fuel level data sooner to be able to perform some computations and possibly notify the telematics device 200 of the outcome of such computations. As an example, the telematics server 130 may infer that the temperature is rising at an alarming rate or that the fuel level is dropping at a higher than expected rate (possibly indicating a leak).

Simplifying Some Partial Data Capture Buffers

To address the above-mentioned latency issue, some secondary data types may be designated as having a near real-time priority for delivery to the telematics server 130. In such implementations, partially filled data captured buffers for such secondary data types designated as having near real-time priority are processed by the RDP algorithm simplification when a primary data type is inserted into the send buffer 480.

Figure 10A:
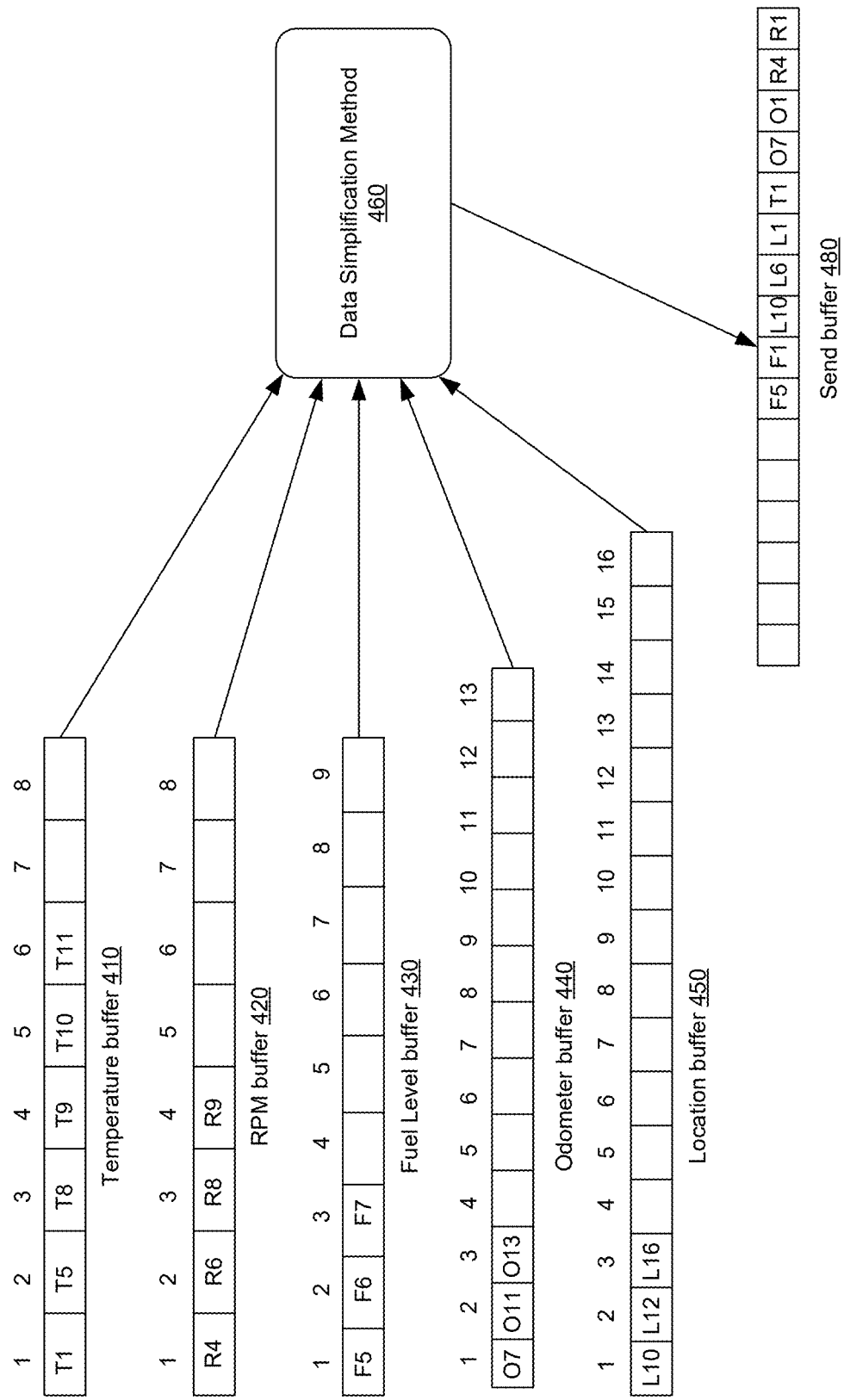
FIG. 10A is similar to FIG. 7A but the data simplification method includes simplification of partially filled secondary data capture buffers for data types that do not have at least one data point in the send buffer, in accordance with embodiments of the present disclosure.

In one embodiment, the telematics device 200 performs a data simplification on partially filled buffers of secondary data types for which no data points have not already been placed in the send buffer 480. FIG. 10A is equivalent to FIG. 7A but with the added feature that some partially filled buffers of secondary data types for which no data points have not already been placed in the send buffer 480 are simplified. In FIG. 10A, the primary data type, which is location, has undergone a simplification and as a result, the locations L1, L6, and L10 have been placed in the send buffer 480. For example, the send buffer 480 contains RPM data points (R1, R4), odometer data points (01, 07), and a temperature data point (T1). The fuel level data type has no data points in the send buffer 480, In accordance with the present embodiment, the telematics device 200 only performs an RDP simplification on the fuel level buffer 430.

Examining the fuel level buffer 430 in FIG. 7A, it can be seen that the fuel level buffer 430 has 7 data points. A simplification of the fuel level buffer 430 may determine a point of maximum error F5 for which the RDP error is greater than the RDP error bound. As such, the fuel level data point F5 is placed into the send buffer 480 along with the very first fuel level data point F1 (which is always placed in the send buffer as noted earlier). The fuel level buffer 430 now contains F5 (the selected point of maximum error), F7 (the very last point in the fuel level buffer 430), and F6 (the point of maximum error between F5 and F7).

Figure 10B:
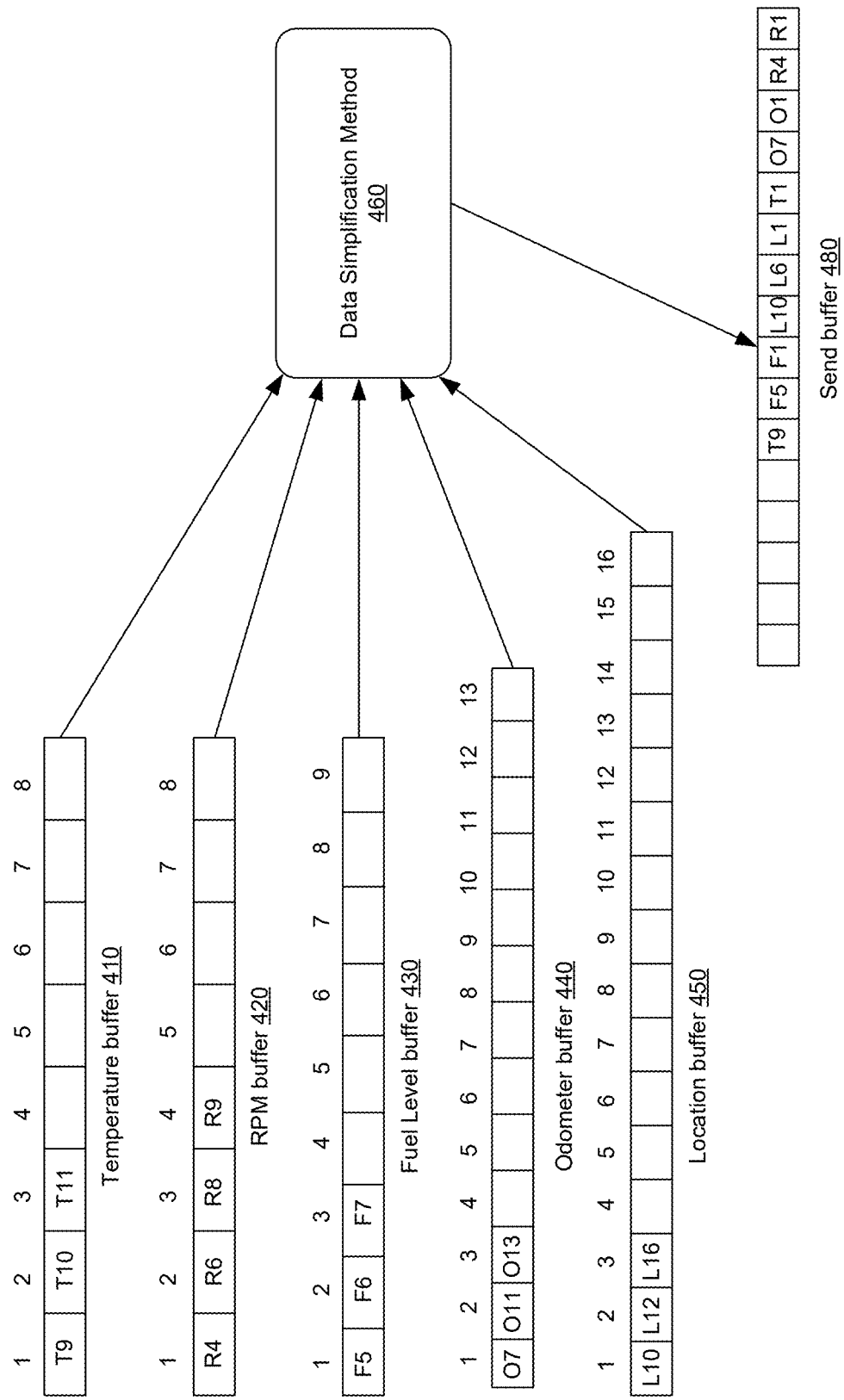
FIG. 10B is similar to FIG. 7A but the data simplification method includes simplification of partially filled secondary data capture buffers that are filled above a particular threshold, in accordance with embodiments of the present disclosure.

In another embodiment, the telematics device 200 performs data simplification on all buffers which have a number of data points that exceed a particular threshold. For example, again with reference to FIG. 7A, the telematics device 200 may perform the data simplification method 460 on any partially filled data capture buffer that is greater than 50% full. In this case, as shown in FIG. 10B, the temperature buffer 410 which has 6 data points out of a possible 8 data points is considered over 50% full. As such, the temperature buffer 410 undergoes another simplification in which T9 is identified as a point of maximum error having an error distance greater than the acceptable error distance. Hence T9 is placed in the send buffer 480 (although another temperature data point is already in the send buffer 480). The points T9, T10, and T11 are placed in the temperature buffer 410. The fuel level buffer 430 is processed as discussed above and results in F1 and F5 being in the send buffer. The RPM buffer 420 and the odometer buffer 440 are not simplified since they are 50% or less than 50% full. Observing the send buffer 480, it can be seen that this method sends even more data points than the method of FIG. 10A. A combined method in which only data types that are not already in the send buffer 480 undergo data simplification, and only if their buffers are over a particular threshold of storage such as 50% or 60%. The methods described with reference to FIG. 10A, FIG. 10B, and the hybrid of such two methods address the latency issue as data points of the secondary type are sent without waiting for their respective data capture buffers to fill up to run data simplification thereon.

Figure 10C:
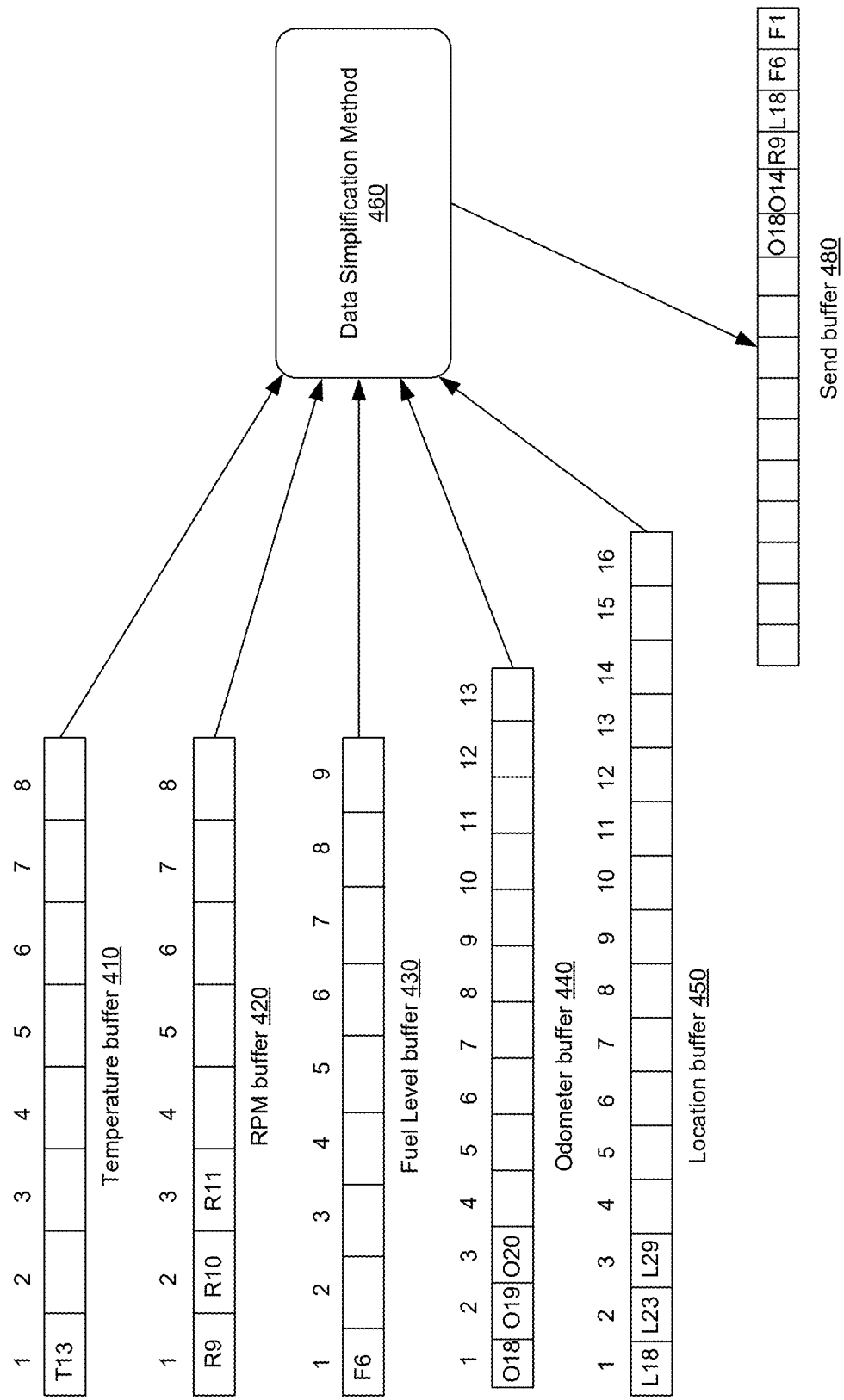
FIG. 10C is similar to FIG. 7B but the data simplification method includes simplification of all partially filled secondary data capture buffers, in accordance with embodiments of the present disclosure.

In yet another embodiment, the telematics device 200 executes the data simplification method on all secondary type data capture buffers in response to the placement of a data point of the primary data type in the send buffer 480. With reference to FIG. 10C, the send buffer contained only fuel level data points F1 and F6, which are of the secondary type. In response to the placement of a primary type data point, such as the location data point L18, the data simplification method 460 runs the data simplification algorithm on all secondary type data capture buffers, namely the temperature buffer 410, the RPM buffer 420, the fuel level buffer 430, and the odometer buffer 440. FIG. 10C is based on FIG. 7B, but with all data capture buffers processed. Firstly, in FIG. 7B the temperature buffer 410 contained the temperature data points T13-T15. This indicates that the last point of maximum error placed in the send buffer 480 was T13. An RDP simplification on just 3 points has indicated that there are no points of maximum error having an RDP error greater than the RDP error bound. Hence, no points of maximum error are placed in the send buffer 480 and only the last point of maximum error placed in the send buffer (T13) is placed (or remains) in the temperature buffer 410. For the RPM buffer 420, the data simplification algorithm determines that R9 is a point of maximum error having an error distance greater than the acceptable error. Hence R9 is placed in the send buffer 480, and the points R9, R10, and R11 are placed in the RPM buffer 420. For the fuel level buffer 430, the telematics device 200 applies the data simplification method 460 and when the RDP algorithm is applied, the RDP algorithm does not find any point of maximum error having an RDP error greater than the RDP error bound. Hence, no fuel level points are placed into the send buffer 480. Since the fuel level buffer 430 had the data point F6 in the first location thereof, this indicates that F6 was the last point of maximum error placed in the send buffer 480 in the previous iteration of the algorithm. Since no new points of maximum error were selected, then only the last selected point of maximum error F6 is placed into the fuel level buffer 430. Finally, with respect to the odometer buffer 440, a data simplification algorithm based on the RDP algorithm determines that O14 and O18 are points of maximum error having an RDP error greater than the RDP error bound. As such, the points O14 and O18 are placed into the send buffer 480. Furthermore, the points O18, O19, and O20 are placed into the odometer buffer 440. The main advantage for the data simplification method 460 used in FIG. 10C is that the telematics server 130 knows that all secondary data type data capture buffers have been processed. As such, when the telematics server 130 receives the contents of the send buffer 480 and determines the absence of data points for any secondary data type, the telematics server 130 can assume that the secondary data type has not changed significantly in value since the last received data point of the secondary data type. Advantageously, the telematics server 130 can make a reasonably accurate estimate of the value of a secondary data type that was not included in the send buffer 480.

The above embodiments of the data simplification method 460 are described below with reference to FIG. 8 and with reference to FIG. 12, FIG. 13, and FIG. 14.

Figure 12:
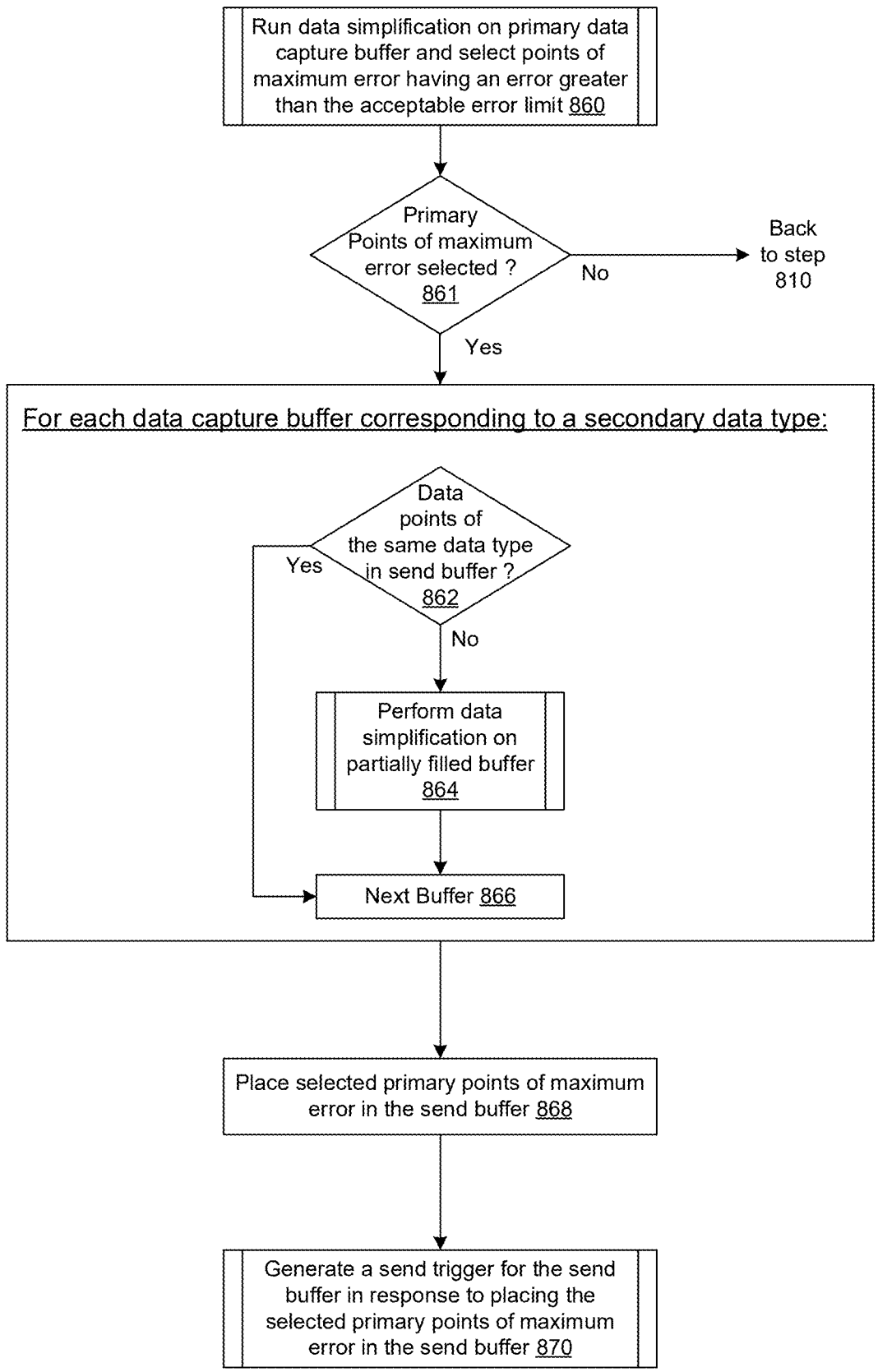
FIG. 12 is a flowchart depicting steps to modify the method of FIG. 8 to perform the data simplification described in FIG. 10A.

With reference to FIG. 12, the steps 810 through 850 of FIG. 8 apply. Subsequent to step 850, the method performs a number of steps 860, 861, 862, 864, 866, and 868 for each data capture buffer corresponding to a secondary data type. Finally, the method executes step 870 as in FIG. 8. The method of FIG. 12 cycles through the secondary data capture buffers and repeats the steps 862, 864, and 866. For example, with reference to FIG. 10C, there are four data capture buffers corresponding to a secondary data type, namely the temperature buffer 410, the RPM buffer 420, the fuel level buffer 430, and the odometer buffer 440. Hence, the steps 862, 864, and 866 in FIG. 12 are repeated four times.

Turning back to FIG. 12, steps 860 and 861 have been copied from FIG. 8 to illustrate where the other steps of the method of FIG. 12 fit in.

At step 862, the telematics device checks whether there are any data points of the same type as the type of data stored in the current data capture buffer, which are stored in the send buffer 480. If there are data points of the current data type stored in the current data capture buffer, then control goes to step 866. If there are no data points in the send buffer 480 having the same data type as the data stored in the current data capture buffer, then control goes to step 864. At step 864, the telematics device 200 performs data simplification on the current data capture buffer which is partially filled with captured data points. Then control goes to step 866. At step 866, the telematics device 200 checks whether all the data capture buffers corresponding to secondary data type have been processed. If all data capture buffers corresponding to secondary data types have been processed, then control goes to step 868. If some data capture buffers corresponding to secondary data types have not yet been processing, the telematics device 200 selects the next secondary data capture buffer and control goes back to step 862.

At step 868, the method places the selected primary points of maximum error in the send buffer 480. Finally, the telematics device 200 performs the step 870, which has been described above with reference to FIG. 8, and which generates a trigger for the contents of the send buffer 480 to be sent to the telematics server 130.

Advantageously, the method of FIG. 12 addresses the issue of latency for some secondary data types. Specifically, the method of FIG. 12 ensures all secondary data type capture buffers have undergone data simplification. For secondary data capture buffers which were full, have been processed, and had some data points therefrom placed in the send buffer, no simplification is necessary for partially filled instances of such secondary data capture buffers. However, for secondary data capture buffers for which the corresponding data capture types do not have any data points of maximum error placed into the send buffer 480, the telematics device 200 performs data simplification on partially filled instances of those secondary data capture buffers. As such, when the telematics server 130 receives the contents of the send buffer 480, the telematics server 130 is assured that all secondary data types have been processed. As such, any secondary data type for which no points of maximum error are present in the received contents of the send buffer 480, can be assumed by the telematics server 130 not to have significantly changed in value since the last data point received for such data type.

Figure 13:
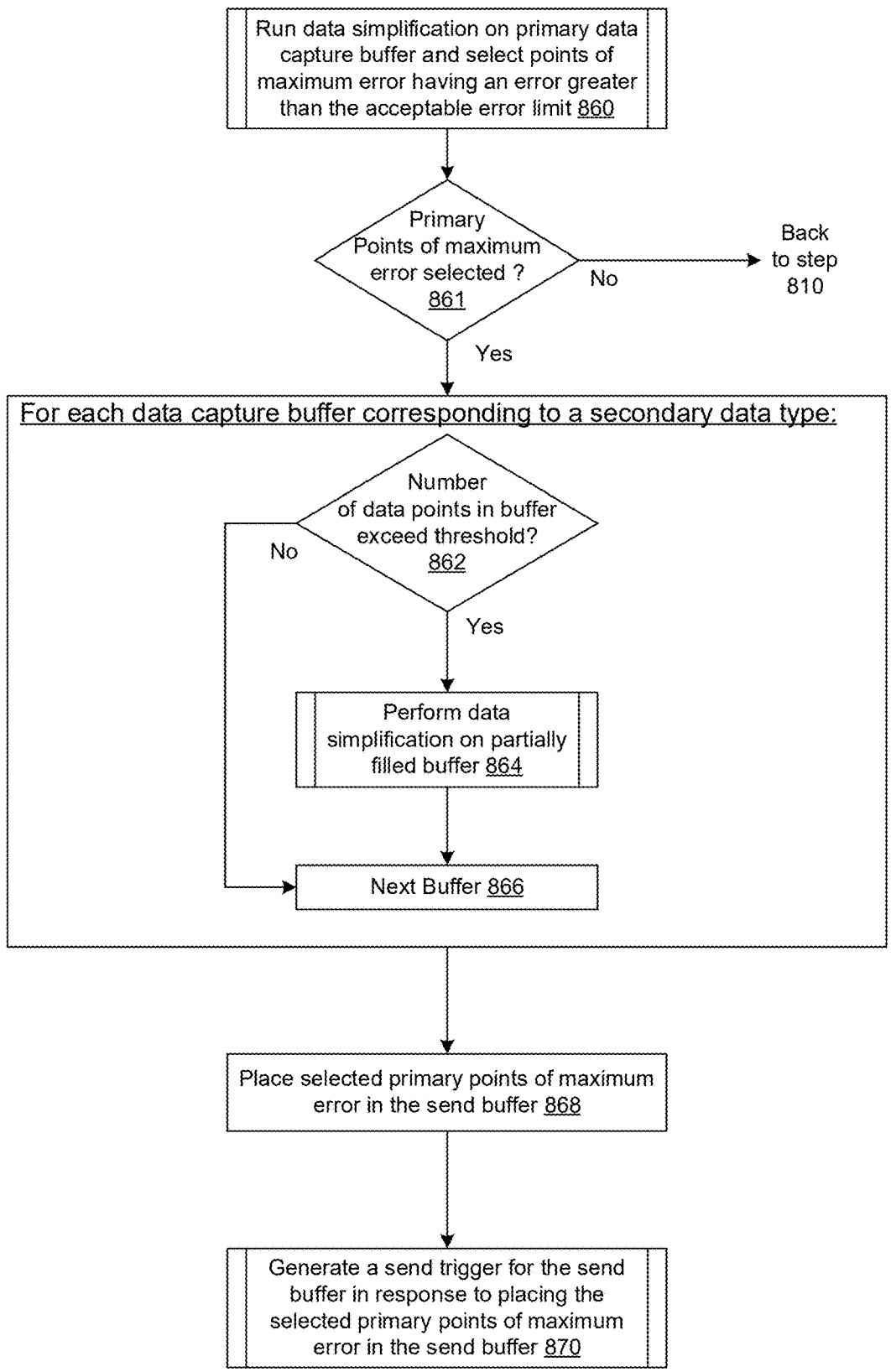
FIG. 13 is a flowchart depicting steps to modify the method of FIG. 8 to perform the data simplification described in FIG. 10B.

With reference to FIG. 13, the steps 810 through 861 of FIG. 8 apply. Subsequent to step 861, the method performs a number of steps 862, 864, and 866 for each secondary data capture buffer corresponding to a secondary data type, as explained above with reference to FIG. 12. At step 862, the telematics device 200 checks whether the current data capture buffer has a number of data points that exceeds a particular threshold. In one implementation, the telematics device 200 checks whether a particular percentage of the number of spaces in the current data capture buffer is full. For example, the telematics device 200 may check that the current data capture buffer is more than 50% full or more than 70% full.

In another implementation, the telematics device 200 checks whether the number of data points exceeds a minimum threshold number of data points. For example, the telematics device 200 may only perform data simplification on a current secondary data capture buffer that has a minimum of 5 data points or 8 data points. When the number of data points in the current secondary data capture buffer corresponding to a secondary data type exceeds a particular threshold, control goes to step 864. When the number of data points in the current data capture buffer does not exceed the particular threshold, control goes to step 866. At step 864, the telematics device 200 performs data simplification on the current secondary data capture buffer which is partially filled with captured data points of the secondary data type. Then control goes to step 866. At step 866, the telematics device 200 checks whether all the secondary data capture buffers have been processed. If not, the telematics device 200 selects the next secondary data capture buffer and control goes back to step 862. Finally, the telematics device 200 performs the steps 868 and 870, which has been described above with reference to FIG. 8. The method of FIG. 13, performs data simplification on partially-filled secondary data capture buffers whether the send buffer 480 contains data points of the same secondary data type or not. Advantageously, this may lead to more secondary data points of secondary data types that are being captured at a high rate, be placed in the send buffer 480, if such secondary data points contain selected points of maximum error. However, due to the likelihood that the data simplification method 460 may select a point of maximum error only when there are sufficient data points in the data capture buffer, this method minimizes the number of secondary data capture buffers that are simplified by limiting the data simplification to buffers that are sufficiently full with data points.

Figure 14:
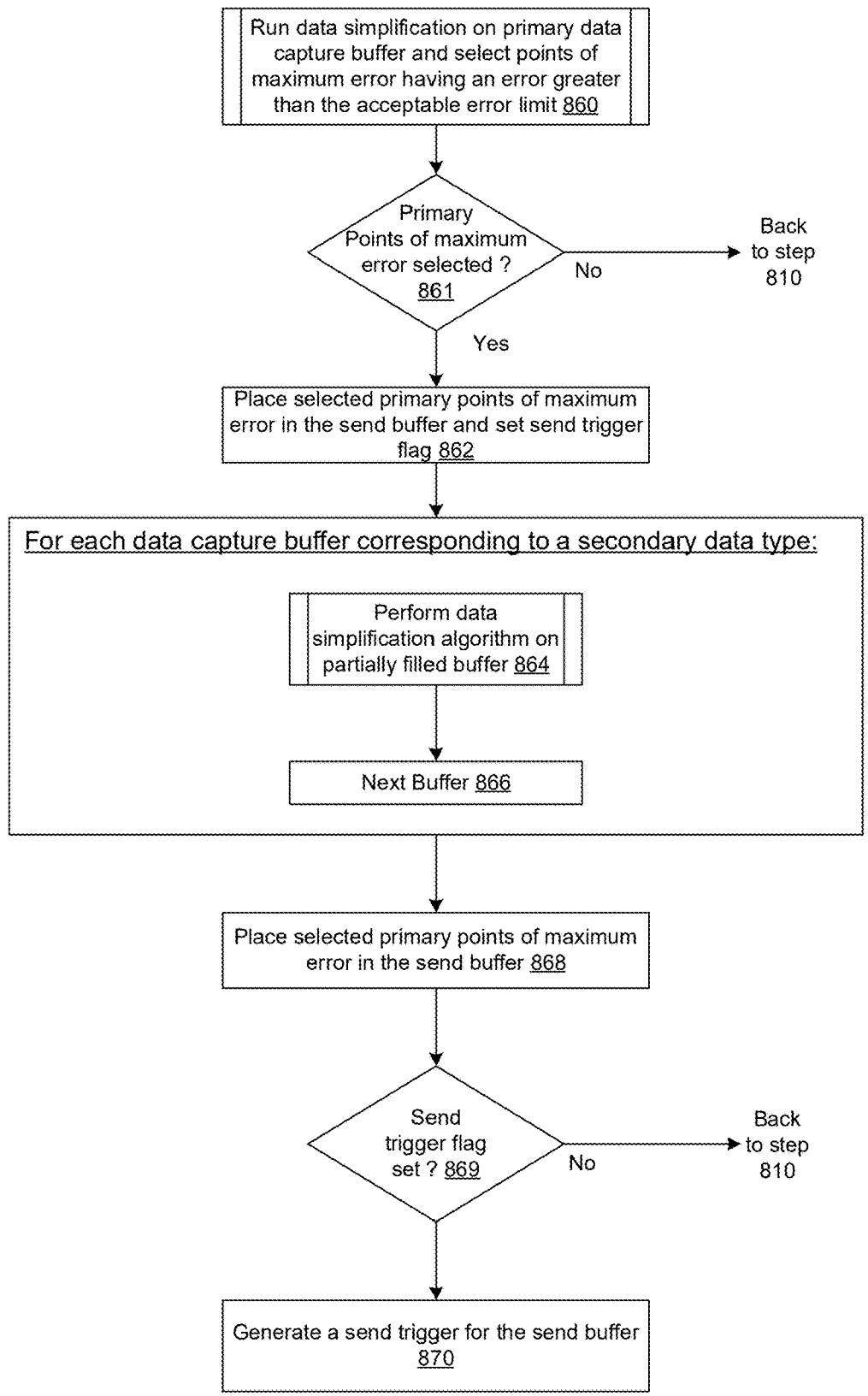
FIG. 14 is a flowchart depicting steps to modify the method of FIG. 8 to perform the data simplification described in FIG. 10C.

FIG. 14 depicts a method similar to the ones of FIG. 12 and FIG. 13 but in which the step 864 comprises the telematics device 200 performing data simplification on every secondary data capture buffer corresponding to a secondary data type. Performing data simplification on every data capture buffer corresponding to a secondary data type, whether that buffer is full or not, will increase the amount of captured data. In some instances, the inventors have observed an increase in the amount of captured data by 10%. However, including more secondary data points reduces the latency of receiving such data points by the telematics server 130 thus allowing the telematics server 130 to make some determinations, and potentially issuing commands to the telematics device 200 to perform some actions. FIG. 14 also shows that some steps may be performed in a different order. For example, after step 860 and step 861, which are similar to the step 860 and step 861 in FIG. 12 and FIG. 13, the method performs step 862.

At step 862, the telematics device 200 places selected points of maximum error of the primary data type ("primary points of maximum error") in the send buffer and sets a send trigger flag. Steps 864 and 866 are repeated for each data capture buffer corresponding to a secondary data type. Control then goes to step 868. At step 868, the selected primary points of maximum error are placed in the send buffer 480. Then, at step 869, the telematics device checks whether a send trigger flag has been set. When a send trigger flag has not been set, control goes back to step 810. When a send trigger flag has been set, control goes to step 870.

At step 870, the telematics device 200 generates a send trigger for the send buffer causing the contents of the send buffer 480 to be sent to the telematics server 130.

Send Trigger Delayed when Primary Data is not Significantly Changing

Figure 11:
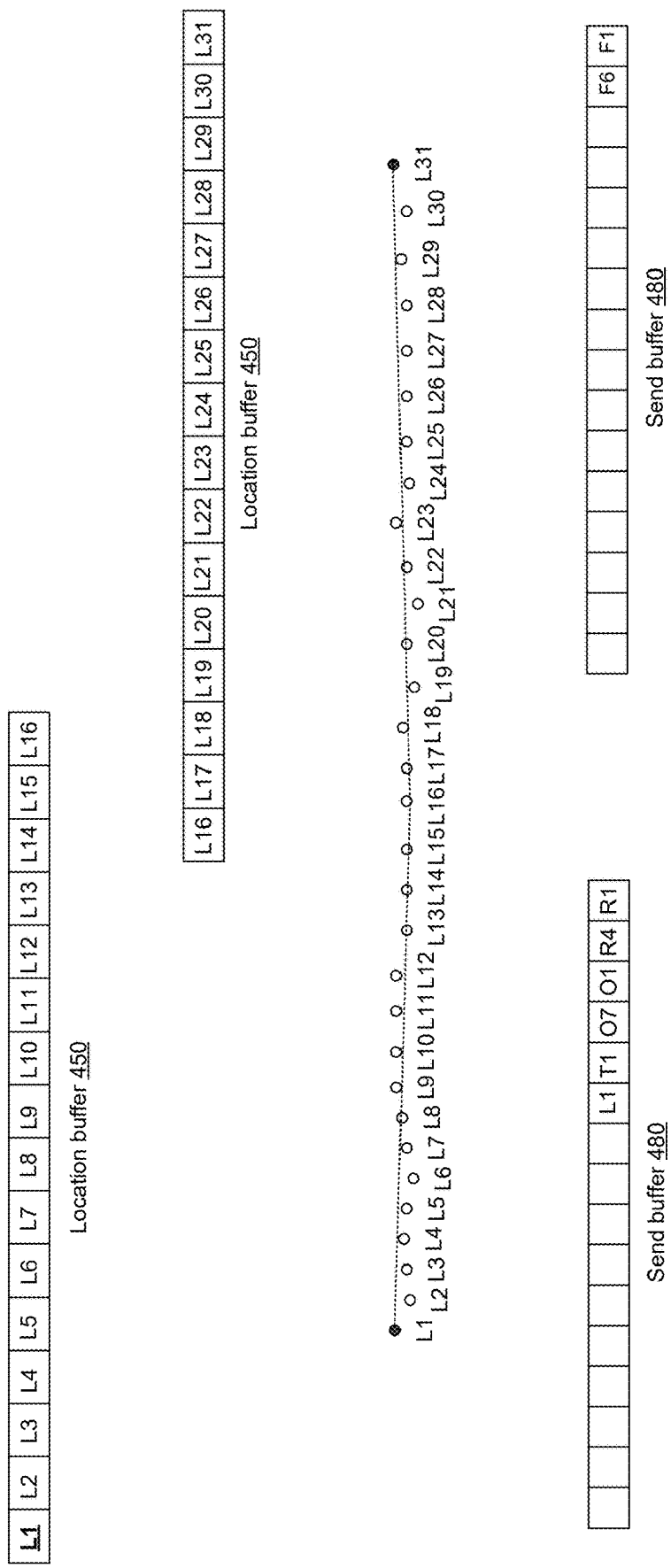
FIG. 11 depicts a plurality of location data points representing an asset that does not substantially change the course thereof.

The implementations discussed thus far trigger sending the contents of the send buffer 480 to the telematics server 130 when a point of maximum error having an error distance greater than the acceptable error, and is of the primary data type, is placed into the send buffer 480. As discussed above, when data of primary data type is slowly changing to the extent that no points of maximum error are selected and placed into the send buffer 480, then sending the contents of the send buffer 480 including points of maximum error for secondary data types is delayed. As such, the telematics server 130 is unable to make inferences about the values of some parameters of the secondary data types for an extended period of time. One solution to this problem is the timeout mechanism discussed with reference to step 720 in the method 700 of FIG. 6. However, a timeout mechanism can still be set to a high value relative to the rate of change of the values of some secondary data types. Hence, another solution that is contemplated is to designate multiple data types as primary data types. For example, with reference back to FIG. 11, the telematics device 200 may designate both the location and the fuel level as primary data types. Hence, the placement of F1 and F6 in the send buffer 480 triggers sending the contents of the send buffer 480 to the telematics server 130. Additionally, since the fuel level is designated as a primary type, the placement of a fuel level data point in the send buffer 480 triggers data simplification of partially-filled data capture buffers containing data points of the secondary type.

Last Point Having a Large Error but not Sent in the Current Data Simplification

Figure 15:
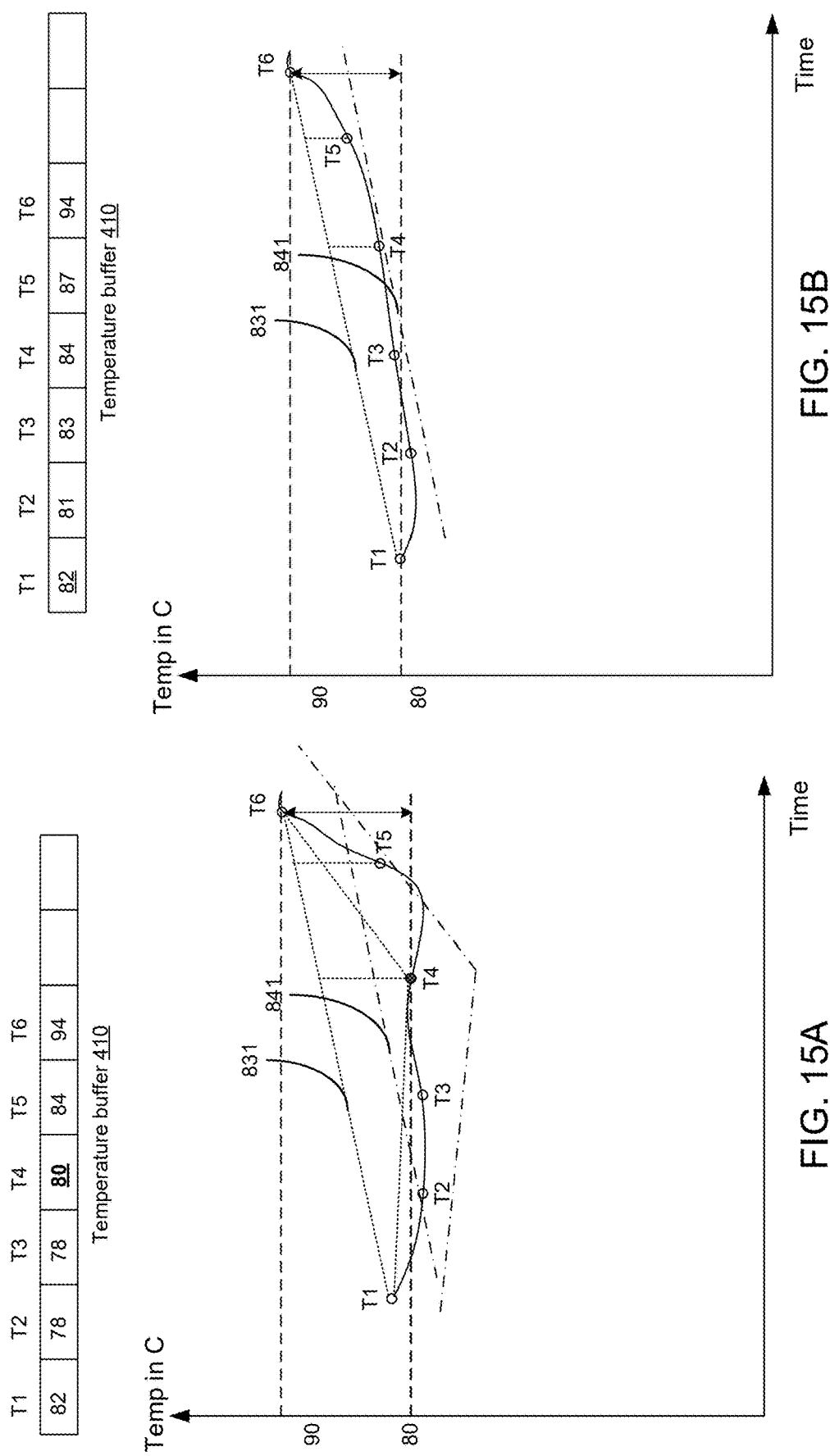
FIG. 15A is a graph depicting the case when a last point in the data capture buffer has an estimate error, which is above a particular threshold, and the data capture buffer contains a point of maximum error having an error distance greater than the acceptable error.
FIG. 15B is a graph depicting the case when a last point in the data capture buffer has an estimate error, which is above a particular threshold, and the data capture buffer does not contain a point of maximum error having an error distance greater than the acceptable error.

In the aforementioned implementations, the last point in a data capture buffer gets added to the next instance of that data capture buffer after data simplification is performed on that data capture buffer. If the last data point in a data capture buffer had a significantly high value relative to a predetermined threshold, the value of the last data point may be of high significance to the telematics server 130 and as such delaying sending the last data point until the next time the same data capture buffer is simplified may have unintended consequences for some real-time systems. To illustrate, a reference is made for FIG. 15A and FIG. 15B. Both figures have temperature data points. In FIG. 15A, the data simplification method 460 is applied to the temperature buffer 410. First the point of maximum error T4 is identified as a point of maximum error having an error distance greater than the acceptable error limit (or threshold). This can be verified by observing that T4 has the largest vertical distance from the RDP segment line 831 and that it is outside of the RDP error line 841. Upon recursively applying the data simplification to the points between T1 and T4 and between T4 and T6, it appears that only the point T4 is a point of maximum error having an error distance greater than the maximum acceptable error. Accordingly, only T4 is placed in the send buffer 480. However, observing that the value of T6 is 94 Celsius which is significantly higher than a predetermined threshold of 80 Celsius, it is clear that such information is important to report as a high temperature may have a great impact on the operation of the asset. So, while sending T4 provides a relatively recent value for temperature to the telematics server 130, the value of T4 does not convey a condition that exists only for the last data point (T6). With reference to FIG. 15B, the temperature values in the temperature buffer 410 are such that no point of maximum error meets the condition that it has an error distance greater than the acceptable error distance. As such, no temperature data points are placed in the send buffer when the data simplification algorithm is run on the temperature buffer 410 of FIG. 15B. In this case, the telematics server 130 receives no recent temperature data points and also misses that increase in value of the last data point (T6).

The above-identified problem is solved by modifying the data simplification algorithm to add the last point in a data capture buffer if the last data point has an estimate error greater than a particular threshold. In some implementations, the estimate error is determined as the difference between the value of the data point and a predetermined threshold. For example, with reference to FIG. 15A, the predetermined threshold is 80 degrees Celsius. In other implementations, the estimate error is determined as the difference between the value of the data point and the value of the first data point in the data capture buffer. For example, in FIG. 15B, the estimate error is the difference between the value of T6 and that of T1. In some implementations, the last point in the data capture buffer is selected for placement in the send buffer when the estimate error for the last data point exceeds an absolute threshold (e.g., 10 degrees Celsius). In other implementations, the last data point is selected when the estimate error thereof is an increase in the value of the corresponding data parameter by a particular percentage. For example, an increase by 20% in the value of the last data point either relative to a fixed threshold or to the value of the first data point, causes the telematics device 200 to place the last data point in the send buffer. In some implementations, the estimate error is computed as the difference between the value of the last data point and the value of the lowest value data point in the data capture buffer. For example, in FIG. 15B, the estimate error would be computed as the difference between T6 and T2 as T2 is the lowest temperature data point.

Figure 16:
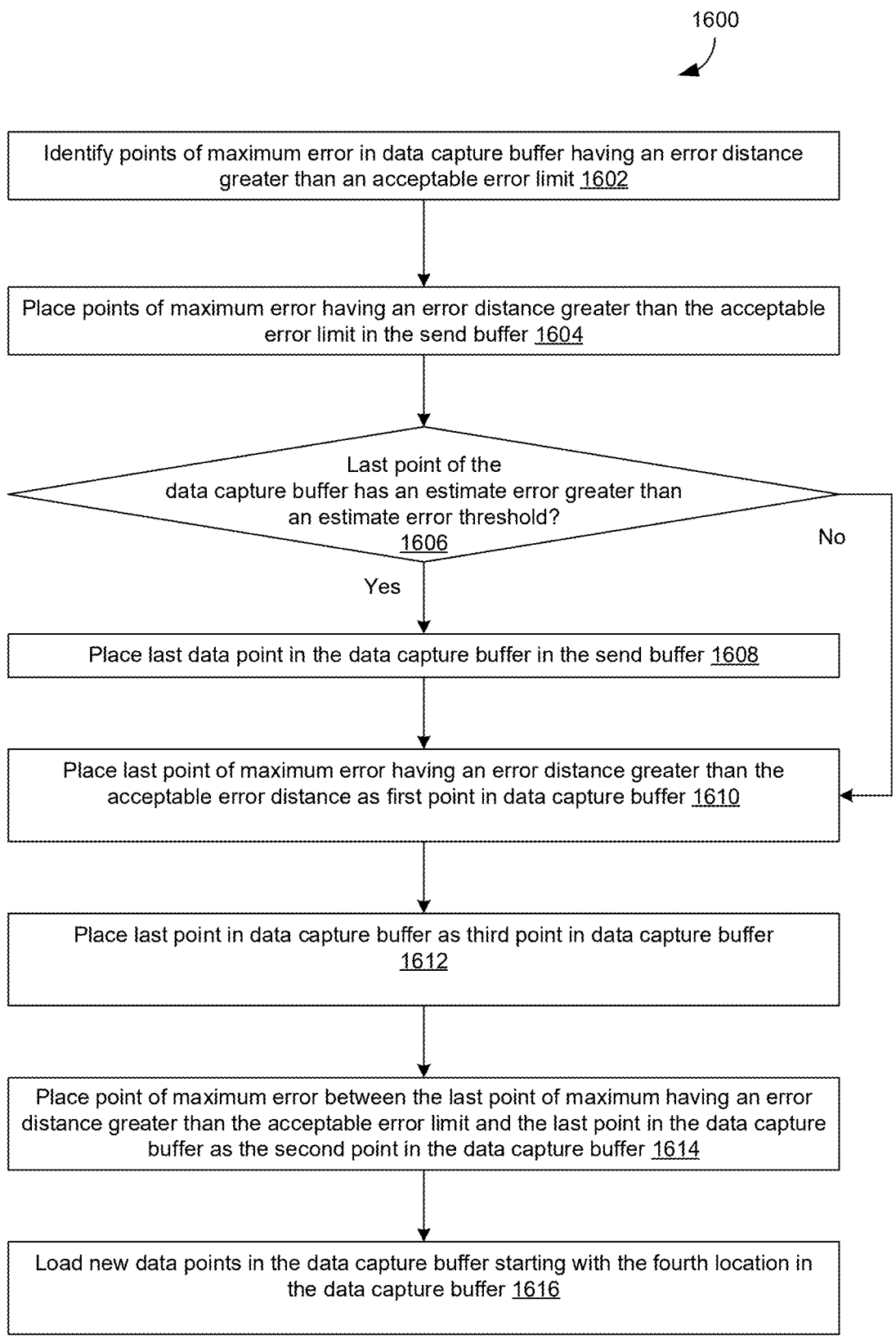
FIG. 16 is a flowchart depicting a method of simplifying a data capture buffer, in accordance with embodiments of the present disclosure.

FIG. 16 depicts a data simplification method 1600 as a possible implementation of the data simplification method 460 discussed throughout the disclosure. The data simplification method 1600 assumes that the first point of any data type is sent by the telematics device 200 to the telematics server 130. The data simplification method 1600 begins with a data capture buffer containing a plurality of data points of a secondary data type.

At step 1602, the data simplification method 1600 identifies points of maximum error in a data capture buffer. The identification of points of maximum error may be done by measuring either a vertical distance or a perpendicular distance between each data point in the data capture buffer and a line segment connecting the first data point and the last data point in the data capture buffer. When a point of maximum error has an error distance from the line segment that is, greater than an acceptable error limit, the point of maximum error is identified as having an error distance greater than the acceptable error limit. The method is recursively repeated between the first point and the identified point of maximum error, and between the identified point of maximum error and the last point. The method recursively identifies points of maximum error having an error distance greater than the acceptable error limit among the data points in the data capture buffer.

At step 1604, the identified points of maximum error that each has an error distance greater than the acceptable error limit are placed in a send buffer in preparation to be sent by the telematics device 200 to the telematics server 130.

Step 1606 is optional and may be carried out for secondary data types for which an increase in value of a data point above an estimate error threshold needs to be reported to the telematics server 130 sooner rather than later. Accordingly, at step 1606 the data simplification method 1600, which is being carried out by the telematics device 200, checks whether the last point in the data capture buffer has an estimate error greater than an estimate error threshold. There are a number of possible implementations for determining whether the estimate error of the last point is greater than an estimate error threshold. In one implementation, the estimate error is determined as the difference between the value of the last data point in the data capture buffer and a predetermined value. In another implementation, the estimate error is determined as the difference between the value of the last data point in the data capture buffer and the value of the first data point in the data capture buffer. The estimate error threshold comprises either a number or a percentage. For example, if the last data point is above the predetermined value or the value of the first data point by a particular percentage (e.g. 20%), then the last data point is considered to have an estimate error greater than the estimate error threshold. When the last point of the data capture buffer has an estimate error greater than the estimate error threshold, control goes to step 1608. When the last point of the data capture buffer does not have an estimate error greater than the estimate error threshold, control goes to step 1610.

At step 1608, the last data point in the data capture buffer is stored in the send buffer.

At step 1610, the data simplification method places the last point of maximum error determined for the data capture buffer and which has an error distance greater than the acceptable error limit into the data capture buffer, at the first location thereof.

At step 1612, the data simplification method places the last point of the data capture buffer in the third location thereof.

At step 1614, the data simplification method places, in the second location of the data capture buffer, the point of maximum error having the highest error located between the last point of maximum error which has an error distance greater than the acceptable error limit, and the last data point in the data capture buffer.

At step 1616, the telematics device 200 loads new data points in the data capture buffer starting at the fourth location after the three data points placed in the data capture buffer in steps 1610, 1612 and 1614.

Advantageously, the data simplification methods discussed in this disclosure ensure faster transmission of data points that have significant value changes to the telematics server 130.

Figure 17:
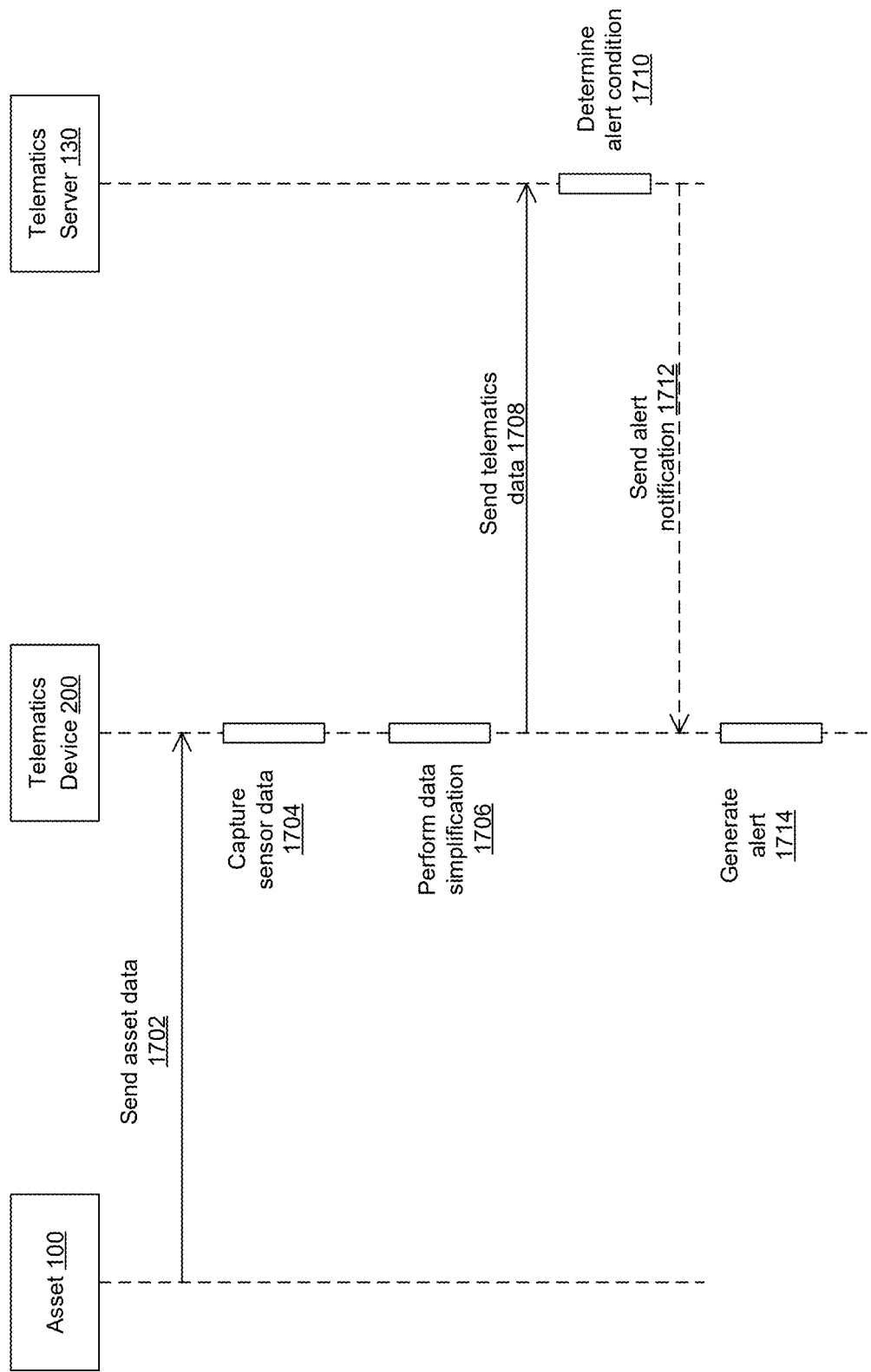
FIG. 17 is a message sequence diagram depicting an embodiment in which near real-time data and notifications are exchanged between a telematics device and a telematics server, in accordance with embodiments of the present disclosure.

FIG. 17 depicts a sequence diagram for a non-limiting embodiment in which data simplification is utilized to provide near real-time notification between a telematics server and a telematics device.

At step 1702, the asset 100 sends asset data 112 to the telematics device 200. Asset data 112 is placed on the asset communications bus, such as the CAN bus 104. Asset data may comprise data of different types such as engine coolant temperature, RPM, fuel level, and odometer.

At step 1704, the telematics device 200 captures sensor data from a sensor that is built-in or coupled to the telematics device 200. For example, the telematics device 200 may capture accelerometer data, location data, or orientation data from an on-board IMU, 3-axis accelerometer, or location module.

At step 1706, data simplification methods described in this disclosure are applied to the asset data and the sensor data. The selected points of maximum error are placed in the send buffer 480 of the telematics device 200.

At step 1708, the telematics device 200 sends the telematics data which is comprised of the contents of the send buffer 480 to the telematics server 130.

At step 1710, the telematics server 130 analyzes the telematics data and determines a particular event or an alert condition. By way of example only, the telematics server 130 may analyze the acceleration data provided by the accelerometer or IMU and the RPM data provided by the asset. A sudden change in RPM followed by an increase in acceleration over a predetermined threshold may be construed by the telematics server 130 as a harsh acceleration event.

At step 1712, the telematics server 130 sends an alert notification to the telematics device 200. The alert notification indicates to the telematics device 200 which alert condition was detected by the telematics server 130. By way of example, the telematics server 130 may send an alert notification of a harsh acceleration event to the telematics device 200.

At step 1714, the telematics device 200 generates an alert notification to indicate that the alert condition has taken place. By way of example, the telematics device 200 may generate a beeping sound, turn on one or more indicator lights, display a message on a display, or playback an audible message alerting the operator of the asset as to the alert condition.

With respect to detecting the harsh acceleration event mentioned above, there are a number of possible implementations that would ensure that the telematics server 130 receives the necessary RPM data points and acceleration data points in a timely manner so as to send the notification to the telematics device 200 in a timely manner. In one implementation, both the RPM and the acceleration data points are designated as primary data types. Accordingly, whenever a selected point of maximum error of either the RPM type or the acceleration type is placed in the send buffer 480, a send trigger is generated thus ensuring RPM and acceleration data points are sent to the telematics server 130 in a timely manner.

In another implementation, the RPM and acceleration may be secondary data types, however, they are designated as near real-time secondary data types. When a point of maximum error of a primary data type is placed in the send buffer, partially-filled data capture buffers for RPM and acceleration are processed by the data simplification method. Any selected points of maximum error in the partially filled data capture buffers for near real-time secondary data types, are placed in the send buffer 480 and sent with the contents of the send buffer 480 to the telematics server 130.

In either of the aforementioned implementations, the telematics device 200 may also check if the last point in either the RPM or the acceleration buffer has an estimate error that exceeds an estimate error threshold. If the last data point in either the RPM or the acceleration data capture buffer has an estimate error that exceeds an estimate error threshold, the applicable data point is placed in the send buffer and sent with the contents of the send buffer 480 to the telematics server 130.

Advantageously, telematics data 212 is simplified reducing the overhead, utilization of resources, and cost of transmission. At the same time, the data simplification methods discussed ensure near real-time delivery of data points of certain data types that permit the telematics server 130 to determine alert conditions and notify the telematics device 200 thereof. The telematics device 200 generates an alert to notify an operator thereof so that the operator may take corrective action.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A method in a telematics device coupled to an asset via an interface port thereof, comprising:
    capturing a first plurality of data points of at least one primary data type from one of: a first electronic control unit of the asset, a first sensor of the telematics device, and a location module of the telematics device, into at least one primary data capture buffer;
    capturing at least one plurality of data points of at least one secondary data type from at least one of: a second electronic control module of the asset, a second sensor of the telematics device, and the location module into a at least one secondary data capture buffer;
    when the at least one secondary data capture buffer is full:
        performing a data simplification method on the at least one secondary data capture buffer, and
        storing any selected secondary data points selected by the data simplification method in a send buffer;
    when the at least one primary data capture buffer is full:
        performing the data simplification method on the at least one primary data capture buffer, and
        storing any selected primary data points selected by the data simplification method in the send buffer; and
    in response to storing any selected primary data points in the send buffer:
        generating a send trigger causing the telematics device to transmit, using a network interface thereof, data points stored in the send buffer, to a telematics server over a network connecting the telematics device and the telematics server.

2. The method of claim 1, further comprising:
    in response to storing any selected primary data points in the send buffer:
        when there are no data points of the at least one secondary data type stored in the send buffer:
            performing the data simplification method on the at least one secondary data capture buffer even if the at least one secondary capture buffer is partially filled; and
            storing any selected secondary data points selected by the data simplification method in the send buffer.

3. The method of claim 1, wherein the at least one secondary data capture buffer comprises a plurality of secondary data capture buffers each storing captured data points of a secondary data type, and the method further comprises:
    in response to storing any selected primary data points in the send buffer:
        for each current data capture buffer of the plurality of secondary data capture buffers:
            when there are no data points of the secondary data type corresponding to the current data capture buffer stored in the send buffer, performing the data simplification method on the current data capture buffer even if the current data capture buffer is partially filled; and
            storing any selected secondary data points selected by the data simplification method in the send buffer.

4. The method of claim 1, further comprising:
    in response to storing any selected primary data points in the send buffer:
        when a number of data points in the at least one secondary data capture buffer exceeds a particular threshold, performing the data simplification method on the at least one secondary data capture buffer even if the secondary data capture buffer is partially filled; and
        storing any selected secondary data points selected by the data simplification method in the send buffer.

5. The method of claim 1, wherein the at least one secondary data capture buffer comprises a plurality of secondary data capture buffers each storing captured data points of a secondary data type, and the method further comprises:
  in response to storing any selected primary data points in the send buffer:
    for each current data capture buffer of the plurality of secondary data capture buffers:
      when a number of data points in the current data capture buffer exceeds a particular threshold, performing the data simplification method on the current data capture buffer even if the current data capture buffer is partially filled; and
  storing any selected secondary data points selected by the data simplification method in the send buffer.

6. The method of claim 1, further comprising:
  in response to storing any selected primary data points in the send buffer:
    performing the data simplification method on the at least one secondary data capture buffer even if the secondary capture buffer is partially filled; and
    storing any selected secondary data points selected by the data simplification method in the send buffer.

7. The method of claim 1, wherein the at least one secondary data capture buffer comprises a plurality of secondary data capture buffers each storing captured data points of a secondary data type, and the method further comprises:
  in response to storing any selected primary data points in the send buffer:
    for each current data capture buffer of the plurality of secondary data capture buffers:
      performing the data simplification method on the current data capture buffer even if the current data capture buffer is partially filled; and
      storing any selected secondary data points selected by the data simplification method in the send buffer.

8. The method of claim 1, further comprising transmitting data points stored in the send buffer in response to any one of: detecting a send timeout and detecting that the send buffer is almost full.

9. The method of claim 1, wherein performing the data simplification method on a data capture buffer comprises:
  when there are any points of maximum error having an error distance greater than an acceptable error limit in the data capture buffer:
    selecting any points of maximum error having the error distance greater than the acceptable error limit;
    placing all selected points of maximum error in the send buffer;
    placing a last selected point of maximum error in a first location in the data capture buffer;
    placing a last data point in the data capture buffer as a third data point in the data capture buffer; and
    placing a point of maximum error between the last selected point of maximum error and the last data point, in a second location of the data capture buffer.

10. The method of claim 9, further comprising when the last data point has an estimate error greater than an estimate error threshold, placing the last data point in the send buffer.

11. A telematics device, for connecting with an asset, comprising:
  a controller;
  an asset interface coupled to the controller, the asset interface for connecting the telematics device with an asset communications bus of the asset;
  a network interface coupled to the controller; and
  a memory coupled to the controller, the memory storing machine-executable programming instructions which when executed by the controller configure the telematics device to:
    capture a first plurality of data points of at least one primary data type from at least one of: a first electronic control unit of the asset, a first sensor of the telematics device, and a location module of the telematics device, into at least one primary data capture buffer;
    capture at least one plurality of data points of at least one secondary data type from at least one of: a second electronic control unit of the asset, a second sensor of the telematics device, and the location module, into a at least one secondary data capture buffer;
    when the at least one secondary data capture buffer is full:
      perform a data simplification method on the secondary data capture buffer, and store any selected secondary data points selected by the data simplification method in a send buffer;
    when the at least one primary data capture buffer is full:
      perform the data simplification method on the at least one primary data capture buffer, and
      store any selected primary data points selected by the data simplification method in the send buffer; and
    in response to storing any selected primary data points in the send buffer:
    generate a send trigger causing the telematics device to transmit, using a network interface thereof, data points stored in the send buffer, to a telematics server over a network connecting the telematics device and the telematics server.

12. The telematics device of claim 11, wherein the machine-executable programming instructions further configure the telematics device to:
  in response to storing any selected primary data points in the send buffer:
    when there are no data points of the at least one secondary data type stored in the send buffer:
      perform the data simplification method on the at least one secondary data capture buffer even if the at least one secondary data capture buffer is partially filled; and
      store any selected secondary data points selected by the data simplification method in the send buffer.

13. The telematics device of claim 11, wherein the at least one secondary data capture buffer comprises a plurality of secondary data capture buffers each storing captured data points of a secondary data type, and the machine-executable programming instructions further configure the telematics device to:
  in response to storing any selected primary data points in the send buffer:
    for each current data capture buffer of the plurality of secondary data capture buffers:
      when there are no data points of the secondary data type corresponding to the current data capture buffer stored in the send buffer, perform the data simplification method on the current data capture buffer even if the current data capture buffer is partially filled; and
      store any selected secondary data points selected by the data simplification method in the send buffer.

14. The telematics device of claim 11, wherein the machine-executable programming instructions further configure the telematics device to:
in response to storing any selected primary data points in the send buffer:
when a number of data points in the at least one secondary data capture buffer exceeds a particular threshold, perform the data simplification method on the at least one secondary data capture buffer even if the secondary data capture buffer is partially filled; and
store any selected secondary data points selected by the data simplification method in the send buffer.

15. The telematics device of claim 11, wherein the at least one secondary data capture buffer comprises a plurality of secondary data capture buffers each storing captured data points of a secondary data type and the machine-executable programming instructions further configure the telematics device to:
in response to storing any selected primary data points in the send buffer:
for each current data capture buffer of the plurality of secondary data capture buffers:
when a number of data points in the current data capture buffer exceeds a particular threshold, perform the data simplification method on the current data capture buffer even if the current data capture buffer is partially filled; and
storing any selected secondary data points selected by the data simplification method in the send buffer.

16. The telematics device of claim 11, wherein the machine-executable programming instructions further configure the telematics device to:
in response to storing any selected primary data points in the send buffer:
perform the data simplification method on the at least one secondary data capture buffer even if the secondary data capture buffer is partially filled; and
store any selected secondary data points selected by the data simplification method in the send buffer.

17. The telematics device of claim 11, wherein the at least one secondary data capture buffer comprises a plurality of secondary data capture buffers each storing captured data points of a secondary data type, and the machine-executable programming instructions further configure the telematics device to:
in response to storing any selected primary data points in the send buffer:
for each current data capture buffer of the plurality of secondary data capture buffers:
perform the data simplification method on the current data capture buffer even if the current data capture buffer is partially filled; and
store any selected secondary data points selected by the data simplification method in the send buffer.

18. The telematics device of claim 11, wherein the machine-executable programming instructions further configure the telematics device to:
transmit data points stored in the send buffer in response to any one of: detecting a send timeout and detecting that the send buffer is almost full.

19. The telematics device of claim 11, wherein the machine-executable programming instructions which configure the telematics device to perform the data simplification method on a data capture buffer comprise machine-executable programming instructions which configure the telematics device to:
when there are any points of maximum error having an error distance greater than an acceptable error limit in the data capture buffer:
select any points of maximum error having the error distance greater than the acceptable error limit;
place all selected points of maximum error in the send buffer;
place a last selected point of maximum error in a first location in the data capture buffer;
place a last data point in the data capture buffer as a third data point in the data capture buffer; and
place a point of maximum error between the last selected point of maximum error and the last data point, in a second location of the data capture buffer.

20. The telematics device of claim 19, wherein the machine-executable programming instructions further configure the telematics device to:
when the last data point has an estimate error greater than an estimate error threshold, place the last data point in the send buffer.

* * * * *